235-382 SR
2/27/79 OR 4,142,097

United States Patent [19]

Ulch

[11] 4,142,097

[45] Feb. 27, 1979

[54] PROGRAMMABLE KEYBOARD SEQUENCING FOR A SECURITY SYSTEM

[75] Inventor: Bryan D. Ulch, Valencia, Calif.

[73] Assignee: A-T-O Inc., Willoughby, Ohio

[21] Appl. No.: 830,004

[22] Filed: Sep. 1, 1977

[51] Int. Cl.[2] .......................... G06K 5/00; H04Q 3/02

[52] U.S. Cl. ................................ 235/382; 340/149 R

[58] Field of Search ............... 235/379, 380, 381, 382; 340/280, 149 A, 149 R

[56] References Cited

U.S. PATENT DOCUMENTS

| | | | |
|---|---|---|---|
| 3,665,162 | 5/1972 | Yamamoto et al. | 235/380 |
| 3,697,729 | 10/1972 | Edwards et al. | 235/381 |
| 3,794,813 | 2/1974 | Spetz | 235/382 |
| 3,846,622 | 11/1974 | Meyer | 235/382 |
| 3,996,450 | 12/1976 | Kerkhoff | 235/380 |
| 4,023,012 | 5/1977 | Ano et al. | 235/380 |

*Primary Examiner*—Daryl W. Cook
*Attorney, Agent, or Firm*—Knobbe, Martens, Olson, Hubbard & Bear

[57] ABSTRACT

A security system in which personnel are permitted access at certain locations on the basis of data magnetically encoded on a card inserted into the system by the personnel. Access is also limited on the basis of keyboard data entered at the remote location by personnel wishing access. The keyboard data required for entry is a permutation and combination of the data on the employee's card, the particular combination and permutation required at each remote location being independently programmable by switches accessible on the inside of the remote security system.

17 Claims, 2 Drawing Figures

PROGRAMMABLE KEYBOARD SEQUENCING FOR A SECURITY SYSTEM

BACKGROUND OF THE INVENTION

This invention relates to magnetically encoded data card security systems in which access at a secured location is controlled by a comparison of data on a card inserted by personnel into the system with data stored in the system and defining those persons who shall be granted access. More particularly, this invention relates to a system in which, in addition to the card data, keyboard data must be entered by persons wishing access, and wherein the keyboard data is a combination and permutation of the card data entered by persons wishing access.

Such systems, in the past, have utilized static magnetic card readers at remote locations for controlling access through electrically operable devices, such as doors, turnstiles, printers, etc. Prior art systems have been devised in which the remote card readers communicate with a central data processor or operate as standalone units.

The card or badge bearing encoded data used for controlling access is typically inserted in a slot of a reader which reads and decodes the data on the card. Advantageously, this data is encoded as a plurality of magnetically polarized spots in a strip of magnetic material. Such encoded data normally includes an identification number or numbers identifying the card holder. During use, this number encoded by the card is compared with a number or numbers stored in the central computer terminal or at the remote location to ascertain whether the individual inserting the card is entitled to access to a building, room, parking lot, or the like.

In one prior art embodiment, the magnetically polarized spots are used to directly actuate a reed relay or other moving switch mechanism located within the reader. The state of the art system is exemplified by U.S. Pat. No. 3,686,479 entitled Static Reader System For Magnetic Cards, assigned to A-T-O Inc., assignee of the present invention, employing electromagnetic solid state sensors disclosed and claimed in U.S. Pat. No. 3,717,749, also assigned to A-T-O Inc. These patents are hereby incorporated in this disclosure by reference. Such systems have been found to be very reliable and are in use as access control systems in a number of different industries, universities, and government installations.

Operation of such systems as a part of a security network employing a central processor is disclosed and claimed in U.S. Pat. No. 4,004,134, also assigned to A-T-O Inc. and also incorporated herein by reference. This latter system incorporates a central processor which periodically and sequentially polls each of the remote terminals in the system. The remote terminals are enabled to transfer data to the central processor only on receipt of a polling pulse. At the central terminal, data read at the remote location from an inserted card is compared with a master list which includes those persons who shall be given access at that remote location.

It has also been known in the prior art to include, at the remote location, a keyboard. Typically, such keyboard systems require that persons wishing access, in addition to the insertion of a magnetically encoded data card, are required to enter keyboard data, typically a sequence of digits. These digits have typically comprised a permutation and combination of the data encoded on the employee's card, the particular permutation and combination often being different for different remote terminals. In the past, however, the permutation and combination has generally been hard wired into the system, typically at the manufacturing plant, so that the system user was unable to alter the particular combination and permutation in the field after installation. Such a situation degraded the security of the overall system, since after a period of use, it was possible for persons to determine the particular order in which data must be entered in each keyboard in order to gain access into areas for which they are not authorized. In addition, as security problems or personnel turnover occurs in a particular facility, the prior art systems did not permit a change in the keyboard entry code required for authorization in order to reinstitute security in a location where security has been breached or is in jeopardy of being breached.

SUMMARY OF THE INVENTION

The present invention provides a substantial improvement over systems available in the prior art in that it permits a reprogramming of the combination and permutation required for keyboard entry in the field by the system operator.

This system still utilizes the data which is magnetically encoded on personnel cards as the basis for keyboard entry. The particular combination of this data, which must be entered by persons wishing access, as well as the order of such data, is selectable, however, by the system operator and may be changed at will. Since an important element in any security system is the ability to alter on a nonroutine basis parameters required for access, so that persons wishing to breach the security system cannot plan on a set of predetermined security parameters in advance, the present system greatly increases the level of security. In addition, the present invention provides increased flexibility in a system of this type, since it allows the system operator to provide access to different employees at different locations from time to time, depending upon the current security needs in these different locations.

The present invention accomplishes these desirable results by providing a card reading mechanism and a keyboard at or near the location where access is to be controlled. The data read from the magnetically encoded card comprises a plurality of digits in a predetermined order. The data which must be entered on the keyboard comprises a subset of these same digits in a different order, the subset or combination and order or permutation being determined by switches locked within the system and controlled by the system operator. Specifically, the switch data is used to select the subset and reorder data read from the card so that this data may be compared with keyboard data as it is entered into the system. Different personnel have different data encoded digit series on their cards, and must, therefore, enter different number sequences at a particular keyboard. The system only requires that the keyboard data bear a predetermined permutational and combinational relationship with the particular person's card data.

So long as a favorable comparison occurs as each entry is made on the keyboard, access is permitted. As soon as an erroneous keyboard entry is made, however, access is prohibited. In addition, the system includes a timer which prohibits access for a predetermined time period after an erroneous entry has been made at the keyboard. This timer prohibits unauthorized personnel from entering multiple trial combinations in the keyboard to attempt to gain access by trial and error. Such an attempt, with the timer of the present invention, would take an extremely long period of time, during which the person risks being caught.

These and other advantages of the present security system are best understood through the following detailed description which references the drawings, in which:

FIG. 1 is a schematic block diagram of the system used for altering the permutation and combination of keyboard data required for entry in the present invention; and FIG. 2 is a schematic block diagram of a computer system used for implementing a system, such as that shown in FIG. 1, using the program which is included as a part of the disclosure in this application.

DETAILED DESCRIPTION OF THE PREFERRED EMBODIMENT

Figure 1:
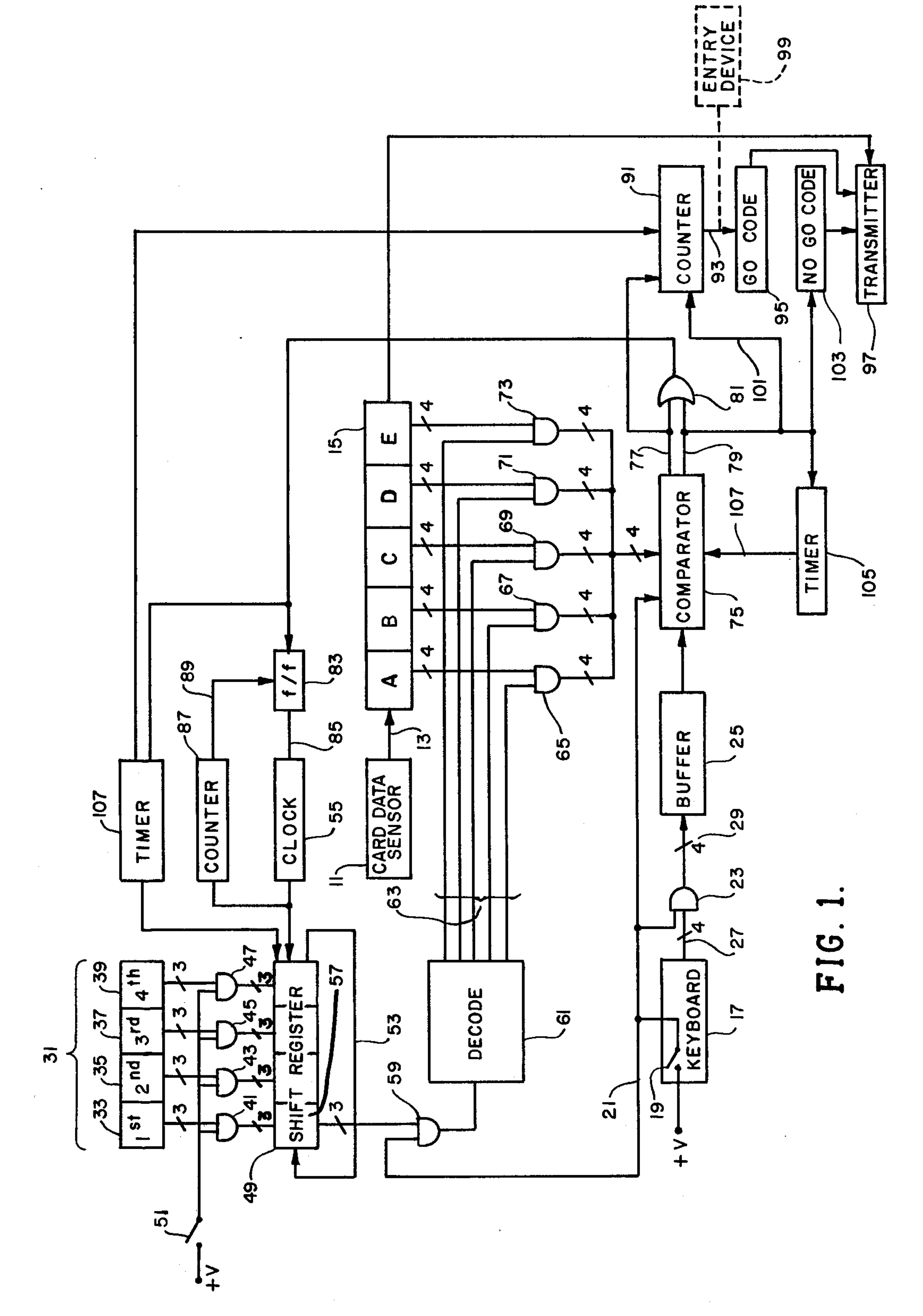

Referring initially to FIG. 1, a sensor 11, substantially as described and claimed in U.S. Pat. Nos. 3,686,479 and 3,717,749, is used to sense magnetically encoded data on a card or badge inserted into the sensor 11. The data is transmitted, as by line 13, to a buffer or storage register 15. As shown in the figure, the register 15 provides storage for a five digit number in a predetermined order, each of the digits being any integer between zero and nine. This data is placed into the register 15 in the same order in which it appears on the card or badge inserted into the sensor 11, and for this reason the five digit locations of register 15 are labeled A, B, C, D, E, it being understood that the digit A appears at a predetermined location on the card or badge, as do each of the remaining digits. No matter what the specific integers are, any badge or card inserted into the sensor 11 will be read into the register 15 in a predetermined order, so that the data stored in the A location in register 15 always has its origin at a predetermined card location. Similarly, data in each of the other register locations in the register 15 originates at a predetermined physical location on the card or badge inserted into the sensor 11.

In addition to inserting a card into the sensor 11, the person wishing to gain access at the remote location where the system of FIG. 1 is installed, will enter a series of digits into a digit keyboard 17. The keyboard 17 will typically have at least 10 keys which permit the user to key the digits from 0 to 9 in any desired order into the system. Every time a key is pushed on the keyboard 17, an entry strobe switch 19 is closed, supplying a pulse input to line 21 which is used for clocking data from the keyboard into the system. Thus, for example, the signal on line 21 provides an input for a gate 23 used for supplying the keyboard data from the keyboard 17 to a buffer 25 used for temporarily storing the most recently entered keyboard data.

As a convention for the remainder of this application, it will be understood that a line, such as line 27 connecting the keyboard 17 to gate 23, marked with a digit next to a slash, represents plural lines. Thus, the line 27 marked with a slash and the digit 4 represents 4 independent data lines used for encoding in binary coded decimal fashion the digits from 0 to 9. Similarly, a line 29 connecting the gate 23 to the buffer 25 comprises a 4-line data bus. The gate 23 shown as an AND gate thus comprises 4 independent AND gates for coupling the lines 27 to the lines 29, each of which is gated by a signal from line 21, which forms the second input to each AND gate.

A plurality of switches 31 are used by the system operator to determine the combination and permutation of data from the user's card which must be entered in the keyboard 17. In the specific example shown in FIG. 1, a selection of four of the five digits in the register 15 labeled A through E must be input in the keyboard 17 in a predetermined order which is set by the switches 31. More specifically, the switches 31 comprise 12 separate switches, three of which are used to encode, in binary fashion, a digit from 1 through 5 to designate, respectively, one of the data elements A through E in the register 15. Thus the three switches 33 are used to encode the first digit which must be keyed into the keyboard 17 by the user. The switches 33 may thus specify any of the data elements located at positions A through E of register 15. Likewise, the switches 35, 37, and 39 each comprise three switches used to encode any one of the positions A through E of register 15. It is important to note that the positions encoded by the switches 31 relate only to data order. That is, if the position A is encoded by the switch 35, that designates that data from a predetermined location on the card inserted into the sensor 11 is to be keyed into the keyboard 17 as the second of 4 digits. If, for example, a particular card has the numeral 8 encoded at position A, the user, in order to gain access at this remote location, must input the number 8 in the keyboard 17 as the second numeral in order. A different person holding a different card may be required to put a different numeral as the second in order into the keyboard 17. At any rate, the switches 31 are used to encode a predetermined data order which is a permutation of the positions A through E in register 15. Any four positions may be selected from the five possibles, and any positions may be repeated. Thus, it is possible utilizing the system shown in FIG. 1 to require that the user, in order to gain access, insert the digit in the A position four times in succession, if each of the switches 33 through 39 encodes the A position. For the system shown in FIG. 1, a combination of four out of the five possible positions of register 15 is encoded by the switches 31, which may be placed in any permutation by the system operator.

As an example, it may be assumed that the operator has set the switches 31 to encode the order D, E, B, A. Thus, the person wishing to gain access inserts his card in the sensor 11. He must then key into the keyboard 17 the numerals encoded in positions D, E, B, and A on his card, in that order, in order to gain access. If the numerals on a particular data card inserted into the sensor 11 in the positions A, B, C, D, and E are 1, 2, 8, 9, 5, this particular person, in order to gain access with the switches 31 encoding the series D, E, B, A, must key the numeral 9, 5, 2, 1 into the keyboard 17 in proper order. A user with a different card, of course, must enter a different number into the keyboard 17, but this number will bear the same position relationship on his card as does the number 9, 5, 2, 1 on the first user's card.

The positions encoded by the switches 31 are connected through plural AND gates 41 through 47 to a shift register 49 which is loaded in parallel with the data on the switches 31 in response to actuation of a load switch 51. The load switch 51 is used by the system operator after setting the switches 33 through 39 to load the shift register 49 by enabling the AND gates 41 through 47, and to thus place the predetermined order, such as D, E, B, A in the above example, in the register 49. This order will remain in the register 49 until the operator changes it by opening the system enclosure with a key and altering the setting of the switches 31 (and again closing the switch 51 to strobe the new data into the register 49).

It will be understood that each of the switches 33 through 39 represents the three switches required to encode positions A through E, and thus the interconnection between the switches 31 and the shift register 49 is four groups of three lines. As described previously, each of the gates 41 through 47 each includes three AND gates connecting three lines from the switches 31 to the shift register 49, each of the AND gates having as one of its two inputs a connection to the switch 51.

The shift register 49 is recirculated by means of connection 53 and a clock 55, but only the data from the first shift register position, position 57, is output from the register 49. This data on three lines is coupled to a gate 59 which, in actuality, must include three AND gates, and is supplied to a decode circuit 61. The decode circuit 61 has five separate output lines 63, only one of which is enabled at any particular time by the decode circuit 61. This enabling is accomplished in accordance with the position encoded on the three lines from the shift register position 57, and the decode circuit 61 thus comprises a matrix for providing a decimal output in accordance with the binary coded three line input.

The decimal output from the decode circuit 61 on lines 63 is used to provide a first input to each of five AND gates 65 through 73. These AND gates are each provided with an input from one of the A through E locations in the buffer 15. It will be understood that the AND gates 65 through 73 are each representative of four AND gates required for binary encoding of the 0 through 9 binary coded decimal data read from the card inserted into the sensor 11 at each position A through E. Each of these four AND gates is provided with an independent input from one of the locations in the buffer 15 and an input from one of the lines 63. Thus, if the input to the decode network 61 decodes the A position, the line 63 connected to AND gates 65 is enabled, permitting the data from position A in buffer 15 to be coupled on four lines to a comparator 75.

The comparator 75 is also supplied with data from the buffer 25, that is, the most recently entered keyboard entry data, and is enabled by the input strobe on line 21. The comparator 75 will provide an output signal on a first line 77 if the data entered in the keyboard 17 is identical to data received from the buffer 15, as designated by position data at location 57 in register 49. The comparator 75, on the other hand, will provide a no go signal on line 79 if the data from the buffer 25 is different from that received through the gates 65–73 from the buffer 15. Either of these signals will activate an OR gate 81 which provides a set input for a flip-flop 83, the output of which, on line 85, is used to enable the clock 55.

As previously explained, the clock 55 recirculates data through the shift register 49. The clock 55 also provides the input for a counter 87 which counts to three and then provides an output signal on line 89 to reset the flip-flop 83, deactivating the clock 55. Thus, every time a signal is provided from the OR gate 81, the clock 55 will produce three output pulses to the shift register 49 to shift the data in this register by three bits. Since three bits are provided from the switches 31 for each position code, the clock 55 shifts the data in the register 49 by one position code.

During use, the first position code encoded by the switches 33 is first output by the shift register position 57. This data is used in the gates 65 through 73 to determine which position data from the register 15 will be compared in the comparator 75 when the first entry is made on the keyboard 17. Once this comparator has produced an output signal following the inputting of the first data into the keyboard 17, the signal provided by the OR gate 81 will clock the shift register 49 three bits to provide the data required for determining the next proper keyboard entry on the keyboard 17. Data in the register 49 will be shifted in this manner, three bits at a time, until all four positions are clocked into location 57 for comparison. If, after each of the four positions has been supplied to the comparator 75, four proper entries are provided at the keyboard 17, then four go signals will occur in succession on the lines 77. These signals are counted by a counter 91 which, when it reaches a count of 4, provides an output signal on line 93 to activate a buffer 95 supplying a go code to a transmitter 97. This transmitter 97 is used to supply (from this remote terminal shown in FIG. 1 to a central control station) data indicating that the person wishing to gain access has pushed four digits on the keyboard 17 in the proper order. Data from the buffer 15 is also supplied to the transmitter 97, and if this data, when sent to the central processor, identifies an employee who is to be granted access at this remote location, the central processor will transmit data to this remote location operating an entry device.

Alternatively, as shown in the dotted line portion of FIG. 1, if the system of FIG. 1 is a stand-alone unit that uses no central processor, the outputting of the proper four digits in sequence from the keyboard 17, which provides a signal on line 93, will enable an entry device 99, such as a solenoid operated door strike.

If an improper key is depressed on the keyboard 17, the comparator 75 will provide a signal on line 79 which, through line 101, will reset the counter 91, so that the counter 91 will start again at zero, looking for four proper input keystrokes. In addition, this signal on line 79 is coupled to a no go code generator 103 which is coupled to the transmitter 97 to transmit data to the central processor indicating that an improper numerical sequence has been entered at the keyboard 17. The signal on line 97 may also be used to initiate the operation of a timer 105 which, through line 107, may be used to disable the comparator 75 for a predetermined period of time. Thus, the timer 105, on receipt of a signal from line 79 indicating that an improper keyboard entry has been made, may prohibit the system from comparing any new keyboard data for a time period (such as one minute) so that a person cannot simply randomly insert numbers at the keyboard 17 to ultimately gain access on a trial and error basis. Such a process, with the delays imposed by the timer 105, would require a very substantial trial and error period, which would subject the user to discovery.

An additional timer 107 may be used to reset the shift register 49 and the counter 91 to their original positions, that is, the counter 91 to zero and the register 49 to a recirculation position identical to the order of the switches 31, a predetermined time period after the initial entry on the keyboard 17, as evidenced by an output from the OR gate 81. The timer 107 thus requires that a person wishing to gain access must put data into the system within a predetermined period of time, and it also assures that the system will be reset to its proper initial postition after each use so that it is in a proper standby mode waiting for the next user to request access.

Figure 2:
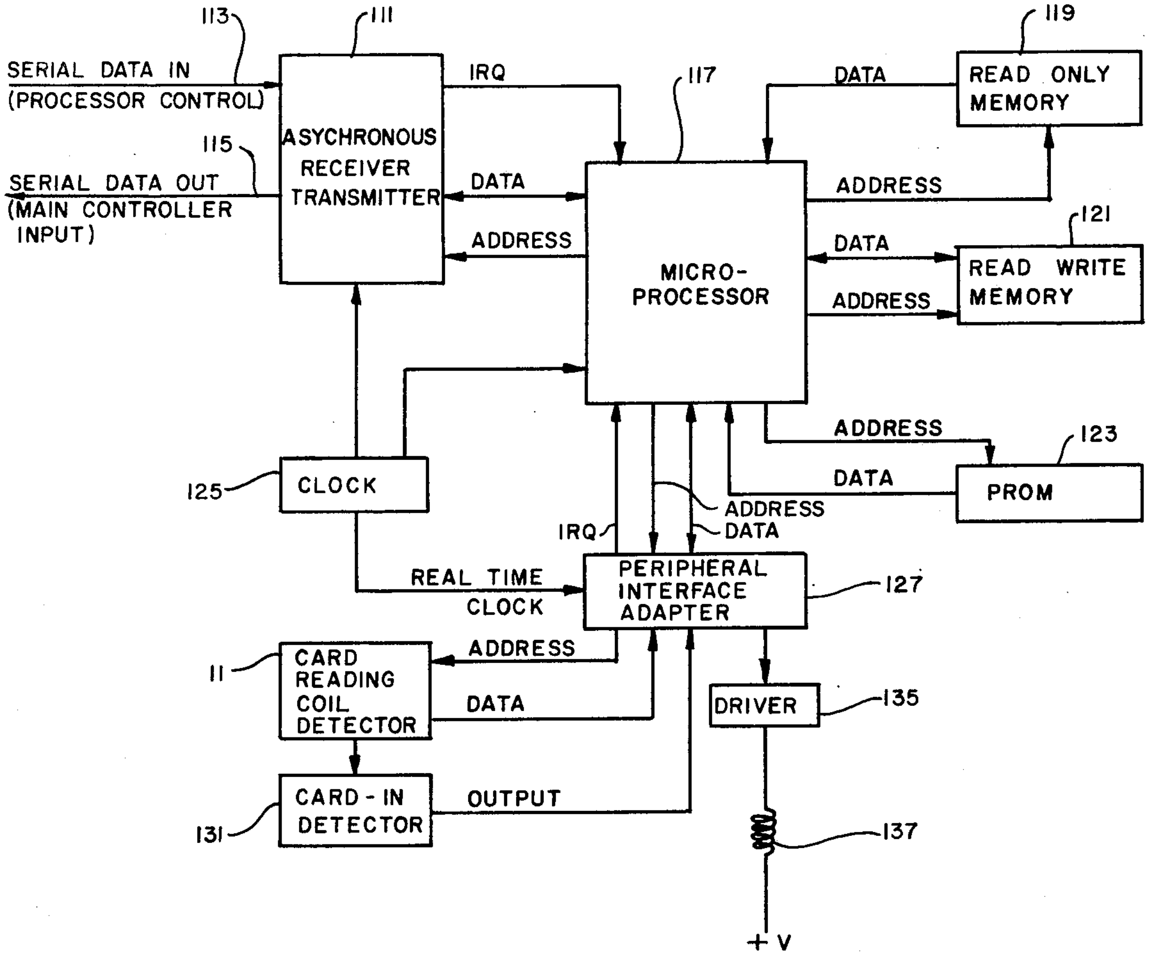

While the system described and referenced to FIG. 1 is adequate for operating this code programming system, the preferred embodiment incorporates a programmed microprocessor. This preferred system is shown in FIG. 2 and includes an asynchronous receiver/transmitter 111 connected to a central processor by means of a polling and data line 113 and an output line 115. The receiver/transmitter in the preferred embodiment is sold by Motorola Electronics under Part No. MC6850. The receiver/transmitter 111 is connected by a two-directional communication link to a microprocessor 117 sold by Motorola Electronics under Part No. MC6800. The processor 117 is interconnected in a well known manner with a read only memory 119 sold by Signetics under Part No. 2616, a read and write memory 121 sold by Motorola Electronics under Part No. MCM6810AL and a programmable read only memory 123 sold by Intersill under Part No. IM5610. A program listing is stored in the read only memory 119 and is included at the end of this specification. The receiver/-transmitter 111, microprocessor 117 and a peripheral interface adapter are interconnected in a known manner to a master clock 125 which provides timing signals for the entire system. In addition, the microprocessor 117 is connected to the peripheral interface adapter 127 sold by Motorola Electronics under Part No. MC6820. This interface adapter 127 is, in turn, connected to the coil detector or sensor 11 described and claimed in U.S. Pat. Nos. 3,686,479 and 3,717,749 and to a card in detector switch 131 and driver and relay network 135 for operating an access apparatus 137 which may be identical to the entry device 99 described and referenced in FIG. 1.

The program which operates the system of FIG. 2 and which is stored in the read only memory 119 is as follows:

```
;*****************************************************
;**                                               ***
;**                                               ***
;**                    PORTER                     ***
;**                                               ***
;**                                               ***
;**********************************************JSD***
;**********************************************GFH***
;
;
;  COPYRIGHT (C)  1976
;  RUSCO ELECTRONIC SYSTEMS
;  GLENDALE, CALIFORNIA
;
;
;  PORTER IS A SOFTWARE PACKAGE TO DRIVE AN
;  M6800 CONTROLLED BADGE READER.
;
;
;
;  BIT MASKS
;
; THESE MASKS ARE USED TO TEST AND SELECT
; INDIVIDUAL BITS IN A BYTE
```

```
        ;
        ; FIRST, THE OPTION BITS
        ;
        ;** FIRST OPTION BYTE
0080    O.DOD   =       $80     ;DOOR OPEN DETECT
0040    O.DM    =       $40     ;DEGRADED MODE+EQUIV
0020    O.AS    =       $20     ;ALARM SHUNT / DOD TIME
0010    O.NG    =       $10     ;"NO/GO" RELAY
0008    O.IMP   =       $08     ;IMPERATIVE GO/NG CMDS
0004    O.TMP   =       $04     ;TAMPER SWITCH
0002    O.ELEV  =       $02     ;ELEVATOR READER
0001    O.IDEK  =       $01     ;WE ARE AN IDEK READER
        ;** NOW FOR THE SECOND BYTE OF OPTIONS
0080    O.IDO   =       $80     ;IDEK C/CK/L OVERRIDE
0040    O.ERAN  =       $40     ;ERROR ANNUNCIATOR
0020    O.DUR   =       $20     ;DURESS RELAY
        ;
        ; NOW FOR THE RELAY BITS
        ;
0080    R.GO    =       $80
0040    R.NG    =       $40
0020    R.AS    =       $20     ;ALARM SHUNT
        ;
        ;  SOME OPDEFS TO FIX UP SCREWED INSTRUCTION NAMES
        ;
        ;
        PION    MACRO   ;TURN ON INTERRUPTS
                CLI
                ENDM
        ;
        PIOFF   MACRO   ;TURN OFF INTERRUPTS
                SEI
                ENDM
        ;
0010    R.ERAN  =       $10     ;ERRAN
```

```
0008   R.DUR    =     $08     ;DURESS RELAY
       ;
       ; NOW FOR THE EXTERNAL SWITCHES
       ; (THESE ARE BITS WITHIN THE WORD S.XXX)
       ;
0010   X.TMP    =     $10     ;TAMPER SWITCH
0020   X.DOD    =     $20     ;DOOR-IS-OPEN SWITCH
0040   X.AS     =     $40     ;SHUNT REQUEST PUSHBUTTON
                                SWITCH
       ;
       ;
       ;
       ;  DELAY CONSTANTS
       ;
       ;
       ;  THE COUNTERS IN THE FOREGROUND ROUTINE
       ;  ARE CLOCKED ONCE EVERY 6.666666666
       ;  MILLISECONDS (150 TIMES A SECOND).
       ;  EACH COUNTER IS A TWO BYTE COUNTER, AND
       ;  IS INCREMENTED ON EACH CLOCK TICK.
       ;  TIMEOUT OCCURS WHEN COUNTER OVERFLOWS
       ;  TO ZERO.
       ;
       ;
FFF8   T.50MS   =     -8      ;50 MILLISECONDS
FF6A   T.01S    =     -150    ;1 SECOND
FE3E   T.03S    =     -450    ;3 SECONDS
FA24   T.10S    =     -1500   ;10 SECONDS
EE6C   T.30S    =     -4500   ;30 SECONDS
       ;
       ;
       ;  DELAY COUNTERS
       ;
       ;
       ;  THESE TWO BYTE COUNTERS ARE INCREMENTED
```

```
          ;  ON EVERY CLOCK TICK.  WHEN ONE OF THEM
          ;  CLOCKS TO ZERO, THE ASSOCIATED COMPLETION
          ;  ROUTINE IS CALLED.
          ;
          ;  IF A COUNTER IS ZERO, IT STOPS
          ;
0000                    ZSECT             ;DEFINE VARIABLES
          0000   CNTRS   =        *
0000             DMCNTR: BLOCK    2
0002             GXCNTR: BLOCK    2       ;(!)SET BY GOON, GXOFF; WAKES
                                            GXOFF
0004             NXCNTR: BLOCK    2       ;SET BY NGON, NXOFF; WAKES NXOFF
0006             DUCNTR: BLOCK    2
0008             ERCNTR: BLOCK    2
000A             ASCNTR: BLOCK    2       ;(!)SET BY GOOFF; WAKES
                                            RLYOFF(20)
000C             NGCNTR: BLOCK    2       ;SET BY NGON; WAKES RLYOFF(40)
000E             GOCNTR: BLOCK    2       ;(!)SET BY GOON; WAKES GOOFF
0010             EQCNTR: BLOCK    2       ;(!)SET WHEN CARD DATA SENT
                 ;                ;WAKES EQUIV

0012             OPCNTR: BLOCK    2       ;(!)SET BY OPEN; WAKES GOON
0014             UNCNTR: BLOCK    2       ;SET BY C.UNLK; WAKES UNON
0016             DOCNTR: BLOCK    2       ;SET BY DOD, WAKES DODTIM
                 ; NOTE: (!) MEANS CLEARED BY NOTIME
          0018   NCNTRS  =        *-CNTRS ;NUMBER OF **BYTES** OF COUNTERS
                 ;
                 ;  STATE FLAGS
                 ;
                 ;
                 ;  SOME BYTES TO INDICATE THE CURRENT MACHINE
                 ;  STATE AND THE RESULTS OF PROCESSING A CARD
                 ;  ENTRY.
                 ;
0018             TMPFLG: BLOCK    1
```

```
0019            DODFLG: BLOCK   1
001A            UNLFLG: BLOCK   1
001B            KBDFLG: BLOCK   1
001C            LCLFLG: BLOCK   1
001D            APBFLG: BLOCK   1
001E            DMFLG:  BLOCK   1
001F            CRDFLG: BLOCK   1
                ;
                ;
                ;
                ; KEYBOARD DATA TABLES
                ;
0020            KEYTAB: BLOCK   4       ;KEYTAB, KEYCNT & DURESF MUST BE
0024            KEYCNT: BLOCK   1       ;CONSECUTIVE
0025            DURESF: BLOCK   1
0026            KEYFLG: BLOCK   1
0027            OLDKEY: BLOCK   1
0028            MASTER: BLOCK   4               ;CARD DIGIT INDICES
002C            MASHER: BLOCK   4       ;""" BUT UNPERMUTED
0030            MATCH:  BLOCK   1
                ;
                ; CARD DATA BUFFER
                ;
0031            DIGTAB: BLOCK   8
                ;
                ;  ERROR RETRIES ID AND COUNT
                ;
0039            NTRIES: BLOCK   1
003A            RTLBUF: BLOCK   7
                ;
                ;  XREG
                ;
                ;
                ;  SAVE AREAS FOR X BECAUSE YOU CAN'T
                ;  SAVE IT ANY OTHER WAY
                ;
```

```
0041        XREG0:  BLOCK   2
0043        XREG1:  BLOCK   2
0045        SCNPTR: BLOCK   2
0047        DIGPTR: BLOCK   2
0049        COMBX:  BLOCK   2
004B        MIXPTR: BLOCK   2
            ;
            ;
            ;
            ;  FPROM AND I/O ADDRESSES
            ;
            ;
            ;
      0080  FPROM   =       $80     ;FPROM OPTIONS
      0084  SCNTAB  =       $84     ;COIL ADDR TABLE
            ;
      00A4  BUFA    =       $A4     ;PIA COIL ADDRESSES
      00A5  CSRA    =       BUFA+1
      00A6  BUFB    =       BUFA+2  ;PIA RELAYS
      00A7  CSRB    =       BUFA+3
            ;
      00A8  ACSTAT  =       $00A8   ;ACIA STATUS PORT
      00A9  ACDATA  =       ACSTAT+1        ;ACIA I/O PORT
            ;
      00E0  ROW0    =       $00E0           ;KEYBOARD SWITCH ROW
            ; DIP SWITCH ADDRESSES
00C3                ASECT   $00C3
      00C3  S.XXX   = *     ;EXTERNAL SENSOR SWITCHES
00C3        S.IDEK: BLOCK   1       ;C/CK BIT AND # OF ERRORS
00C4        S.COMB: BLOCK   1       ;PERMUTATION & COMBINATION
00C5        S.SYS:  BLOCK   1       ;SYSTEM CODE
      00C6  S.AS    = *     ;AS/DOD TIMER COUNT
00C6        S.VTD:  BLOCK   1       ;VTD TIMER COUNT
            ;
            ;
```

```
                ;  RESET AND INTERRUPT VECTORS
                ;
                ;
0FF8                   ASECT   $0FF8
0FF8                   WORD    RTC      ;REAL TIME CLOCK
0FFA                   WORD    $FC04    ;SWI TO KERNEL
0FFC                   WORD    $FC00    ;NMI TO KERNEL
0FFE                   WORD    BACK     ;RESET TO BACKGROUND
                ;
                ;
                ;
                ;**************************************************
                ;
                ;  RTC
                ;
                ;
                ;**************************************************
                ;
                ;  ALL TASKS WHICH REQUIRE TIME DELAYS AND ALL
                ;  PARAMETERS REQUIRING CONTINUOUS MONITORING
                ;  ARE HANDLED BY THIS SET OF ROUTINES.
                ;  SPECIFICALLY, THIS MODULE HANDLES THE
                ;  FOLLOWING TASKS:
                ;
                ;       TAMPER SWITCH MONITORING
                ;       DOOR OPEN PUSHBUTTON MONITORING
                ;       DOOR OPEN DETECT
                ;       RELAY ACTIVATION SEQUENCES
                ;       RELAY CLOSURES AFTER TIME DELAY
                ;       DEGRADED MODE TIMEOUT
                ;       DEAD MAN SET
                ;       CARD EDGE DETECT
                ;
                ;
                ;  DEFINE MODULE STARTING ADDRESS
```

```
                 ;
                 ;
0000                     PSECT
                 ;
                 ;
                 ;       RTC
                 ;
                 ;
                 ;       THIS IS THE MAIN SERVICE ROUTINE FOR THE REAL
                 ;       TIME CLOCK INTERRUPTS.  A RISING EDGE OF THE
                         CLOCK
                 ;       FORCES AN IRQ INTERRUPT WHICH VECTORS TO RTC.
                 ;       RTC IN TURN CALLS SUBROUTINES TO EXECUTE THE
                 ;       VARIOUS TASKS THAT NEED SERVICING ONE AT A TIME.
                 ;
                 ;
0000 96 A6       RTC:    LDAA    BUFB    ;CLR INTERRUPT AT PIA
                 ;
0002 86 3C               LDAA    #$3C    ;SET DEAD MAN HIGH
0004 97 A5               STAA    CSRA
                 ;
0006 BD 022C             JSR     KEYSER  ;SCAN KEYBD
                 ;
0009 BD 001C             JSR     CRDEDG  ;CHK FOR CRD IN
                 ;
000C BD 0093             JSR     APB     ;CHK DOOR OPEN PUSHBUTTON
                 ;
000F BD 0041             JSR     TAMPER  ;CHECK TAMPER SWITCH
                 ;
0012 BD 005F             JSR     DOD     ;CHECK DOOR OPEN DETECT
                 ;
0015 BD 00B4             JSR     LCLSW   ;SEE IF IDEK MODE SWITCH CHANGED
                 ;
0018 BD 00BE             JSR     CNTDN   ;COUNT DOWN SERVICE TIMERS
                 ;
```

```
001B 3B                 RTI               ;RETURN TO BACKGROUND TASK
                ;
                ;
                ;
                ;  CRDEDG
                ;
                ;
                ;  CHECKS FOR CARD, SETS CRDFLG ACCORDINGLY
                ;
                ;       00  NO CARD
                ;       01  CARD IN, NOT YET PROCESSED
                ;       FE  CARD IN, ALREADY PROCESSED
                ;
001C 96 1FZ     CRDEDG: LDAA    CRDFLG
001E 26 12 =            BNE CRDOUT
                ; HERE IF THE CARD WAS NOT IN LAST TIME
0020 96 A6              LDAA    BUFB
0022 84 01              ANDA    #$01
0024 27 1A =            BEQ     CRDDN
0026 97 1FZ             STAA    CRDFLG  ;PUT A 1 INTO CRDFLG
                ; CLEAR KEYTAB, KEYCNT AND DURESF
0028 CE 0006            LDX     #6              ;NUMBER OF BYTES TOCLEAR
002B 4F                 CLRA
002C A7 1FZ     CRDINL: STAA    KEYTAB-1,X
002E 09                 DEX
002F 26 FB =            BNE     CRDINL
0031 39                 RTS
0032 96 A6      CRDOUT: LDAA    BUFB    ;FLAG CARD REMOVAL
0034 84 01              ANDA    #$01
0036 26 08 =            BNE     CRDDN
0038 7F 001F            CLR     CRDFLG
                ; STOP EQUIVOCATION SO EQUIV DOESN'T HAVE TO
                ; CHECK CRDFLG
003B CE 0000            LDX     #0
003E DF 10Z             STX     EQCNTR
```

```
                ;
0040 39         CRDDN:  RTS
                ;
                ;
                ;
                ;       TAMPER
                ;
                ;
                ;       THIS ROUTINE GETS CALLED ON EACH CLOCK TICK,
                        CHECKS
                ;       THE TAMPER SWITCH, AND SETS A FLAG TO DENOTE ANY
                ;       STATE CHANGE.
                ;       THE FOUR STATES OF THE FLAG ARE DESCRIBED BELOW:
                ;
                ;       00      SWITCH OPEN
                ;       01      SWITCH CLOSED, CHANGE NOT YET XMITTED.
                ;       FE      SWITCH CLOSED
                ;       FF      SWITCH OPEN, CHANGE NOT YET XMITTED.
                ;
                ;       THIS ROUTINE CAN CAUSE TRANSISTIONS FROM 00 TO01
                ;       OR FE TO FF.
                ;
                ;
0041 96 80      TAMPER: LDAA    FPROM   ;CHECK IF OPTION IN
0043 84 04              ANDA    #O.TMP
0045 27 17 =            BEQ     TMPDN
                ;
0047 D6 C3              LDAB    S.XXX   ;READ SWITCH
0049 96 18Z             LDAA    TMPFLG  ;TEST SIGN OF TAMPER FLAG
004B 2B 09 =            BMI     TMINUS
                ;
004D C4 10              ANDB    #X.TMP  ;IF PLUS AND IF SW IS CLOSED
004F 27 0D =            BEQ     TMPDN   ;SET FLAG TO 01
0051 86 01              LDAA    #$01
0053 97 18Z             STAA    TMPFLG
```

```
0055 39                 RTS
                ;
0056 C4 10      TMINUS: ANDB    #X.TMP  ;IF MINUS AND IF SWITCH OPEN,
0058 26 04 =            BNE     TMPDN   ;SET FLAG TO FF
005A 86 FF              LDAA    #$FF
005C 97 18Z             STAA    TMPFLG
                ;
        005EP   TMPDN   =       *
005E 39         RTS3:   RTS
                ;
                ;
                ;       DOD
                ;
                ;
                ;       DOD CHECKS DOOR SWITCH ON EACH CLOCK TICK
                ;       SETS AND CLEARS THE DOCNTR TIMER SO THAT
                ;       IF THE DOOR STAYS OPEN LONGER THAN THE TIME
                ;       SPECIFIED IN THE DOD TIME SWITCHES
                ;       'DODTIM' IS CALLED TO SET THE FLAG
                ;
                ;       THE MEANINGS OF THE FLAG ARE:
                ;
                ;       00 SWITCH CLOSED
                ;       01 SWITCH OPEN, CHANGE NOT YET XMITTED
                ;       FE SWITCH OPEN
                ;       FF SWITCH CLOSED, CHANGE NOT YET XMITTED
                ;
                ;       THIS ROUTINE SETS IT FROM OPEN TO C,NX
                ;       DODTIM SETS IS FROM CLOSED TO O,NX
                ;
005F 96 80      DOD:    LDAA    FPROM   ;CHECK FOR DOD OPTION
0061 84 80              ANDA    #O.DOD
0063 27 25 =            BEQ     DODONE  ;NOT BOUGHT
                ;
0065 96 C3              LDAA    S.XXX   ;READ SWITCHES
```

```
0067 84 20            ANDA    #X.DOD  ;LOOK AT DOD SWITCH
0069 27 11 =          BEQ     DOORCL  ;SWITCH WAS CLOSED
006B DE 16Z           LDX     DOCNTR  ;SEE IF TIMER ALREADY SET
006D 26 1B =          BNE     DODONE  ;YES...DO NOT KRUMP!
              ; HERE TO SET THE TIMER
006F CE 0016          LDX     #DOCNTR ;POINTER PASSED TO CALCT
0072 96 C6            LDAA    S.AS    ;GET TIME IN SECONDS 0-15
0074 44               LSRA
0075 44               LSRA
0076 44               LSRA
0077 44               LSRA            ;MOVE NUMBER INTO 4 LSBITS
0078 48               ASLA            ;MULT BY TWO
0079 7E 0213          JMP     CALCT   ;CONVERT FROM SECS & STORE IN
                                       DOCNTR

007C CE 0000  DOORCL: LDX     #0
007F DF 16Z           STX     DOCNTR  ;CANCEL DODTIM REQUEST...ALL
                                       IS WELL
0081 96 19Z           LDAA    DODFLG  ;SEE IF WE JUST MADE A
                                       TRANSITION TO CLOSED
0083 81 FE            CMPA    #$FE    ;WERE WE FULLY OPEN??
0085 26 03 =          BNE     DODONE  ;NOPE
0087 7C 0019          INC     DODFLG  ;SET TO FF, MEANING WE JUST
                                       CLOSED

008A 39       DODONE: RTS
              ;
              ;*******
              ; HERE WHEN DOOR OPEN TOO LONG
              ; SET DODFLG FROM FE TO FF
008B 96 19Z   DODTIM: LDAA    DODFLG  ;CHECK OLD VALUE
008D 26 FB =          BNE     DODONE  ;WAS NOT 00=CLOSED...ERGO,
                                       DO NOT SET OPEN
008F 7C 0019          INC     DODFLG  ;SET TO 01...TELL CONSOLE WE
                                       OPENED
0092 39               RTS
              ;
```

```
                ;
                ;  APB
                ;
                ;
                ;  CHECKS DOOR OPEN PUSHBUTTON.  CAUSES DOOR OPEN
                ;  SEQUENCE WHEN CLOSURE IS DETECTED IF PUSHER'S
                ;  FINGER HAS RIGHT SYSTEM CODE
                ;
0093 96 80      APB:    LDAA    FPROM    ;CHK FOR AS OPTION
0095 84 20              ANDA    #O.AS
0097 27 1A =            BEQ     APBD
                ;
0099 96 1DZ             LDAA    APBFLG   ;IGNORE SWITCH IF
009B 26 0D =            BNE     APX      ;ALREADY SERVICED
                ;
009D 96 C3              LDAA    S.XXX    ;OPEN DOOR IF SWITCH
009F 84 40              ANDA    #X.AS    ;IS PUSHED
00A1 26 10 =            BNE     APBD
00A3 BD 012A            JSR     OPEN
00A6 7C 001D            INC     APBFLG   ;FLAG AS SERVICED
00A9 39                 RTS
                ;
00AA 96 C3      APX:    LDAA    S.XXX    ;CLR FLAG WHEN SWITCH
00AC 84 40              ANDA    #X.AS    ;IS RELEASED
00AE 27 03 =            BEQ     APBD
00B0 7F 001D            CLR     APBFLG
00B3 39         APBD:   RTS
                ;
                ;
                ;  LCLSW
                ;
                ;
                ;  SCANS LOCAL MODE SWITCH AND SETS LOCAL MODE
                ;  TO KEYBOARD OR NOKEYBOARD ACCORDINGLY.
                ;  WORKS IF AND ONLY IF A MODE HAS NOT BEEN
```

```
                ;  FORCED BY THE CONSOLE.
                ;
00B4 96 1C2   LCLSW:  LDAA    LCLFLG  ;CHECK FOR LOCAL MODE
00B6 81 00            CMPA    #$00
00B8 27 03 =          BEQ     LCLRTS
                ;
00BA BD 03E4          JSR     ILKL    ;FORCE KBD OR NOKBD
                ;
00BD 39       LCLRTS: RTS
                ;
         ;
         ;
         ;       CNTDN
         ;
         ;       EVERY TASK INVOLVING A TIME DELAY HAS A
         ;       COUNTER ASSOCIATED WITH IT. THESE TWO BYTE
         ;       COUNTERS ARE LOADED WITH A NUMBER TO ACTIVATE
         ;       THEM. EACH COUNTER THEN INCREMENTS ON EACH
         ;       CLOCK TICK UNTIL IT OVERFLOWS, AT WHICH TIME
         ;       A COMPLETION ROUTINE IS CALLED TO TAKE THE
         ;       APPROPRIATE ACTION.
         ;
         ; YOU SHOULD ALSO BE AWARE THAT EACH
         ; COMPLETION ROUTINE IS CALLED WITH A VALUE IN AC A
         ; EQUAL TO 2^N WHERE N IS THE VECTOR SLOT NUMBER
         ; OF THAT ROUTINE.
         ; THIS MAKES FOR SIMPLIFIED RLYOFF CALLS
         ;
00BE CE  CNTDN:  LDX     #$0000  ;SET LOOP INDICES
00C1 86          LDAA    #$01
         ;
00C3 6D  CNTDNL: TST     CNTRS,X ;CLOCK EACH COUNTER
00C5 27          BEQ     CNTDNS  ;UNLESS ITS ALREADY
00C7 6C          INC     CNTRS+1,X  ;ZERO
00C9 26          BNE     CNTDNS
```

```
00CB 6C          INC     CNTRS,X
00CD 26          BNE     CNTDNS
           ;
00CF 36          PSHA
00D0 DF          STX     XREGO   ;IF COUNTER OVERFLOWS
00D2 86          LDAA    #MSB SERV  ;TO ZERO, CALL ASSOCIATED
00D4 97          STAA    XREGO   ;SERVICE ROUTINE
00D6 DE          LDX     XREGO
00D8 EE          LDX     LSB SERV,X
00DA 32          PULA
00DB 36          PSHA
00DC AD          JSR     0,X
00DE 4F          CLRA
00DF 97          STAA    XREGO
00E1 DE          LDX     XREGO
00E3 32          PULA
           ;
00E4 08   CNTDNS: INX            ;INCREMENT LOOP INDICES
00E5 08          INX             ;LOOP UNTIL ALL CNTRS SERVICED
00E6 48          ASLA            ; SHIFT BIT TO NEXT PLACE
00E7 8C          CPX     #NCNTRS
00EA 26          BNE     CNTDNL
           ;
00EC 39          RTS
           ;
           ;
           ;
           ;     SERV
           ;
           ;
           ;     VECTOR TABLE OF COMPLETION ROUTINES TO
           ;     BE CALLED ON THE EXPIRATION OF THE
           ;     COUNTERS.
           ;
           ;     "OUR KNOCKING HAS AWAKENED HIM."
```

```
        ;
        SERV    =       *
00ED            WORD    DMSET
00EF            WORD    GXOFF
00F1            WORD    NXOFF
00F3            WORD    RLYOFF  ;DUOFF
00F5            WORD    RLYOFF  ;EROFF
00F7            WORD    RLYOFF  ;ASOFF
00F9            WORD    RLYOFF  ;NGOFF
00FB            WORD    GOOFF
00FD            WORD    EQUIV
00FF            WORD    GOON
0101            WORD    UNON
0103            WORD    DODTIM  ;WHEN DOOR OPEN TOO LONG
        ;
        NSERV   =       *-SERV
        ;
        ;
        ;
        ;       EQUIV
        ;
        ;
        ;       IF THE CONSOLE DOES'T RESPOND TO
        ;       READERS RESPONSE TO CONSOLE'S
        ;       POLL, AND IF DEGRADED MODE IS IN,
        ;       THEN WAIT 10 SECONDS AND:
        ;
        ;       A.) OPERATE GO RELAY IF IDEK AND
        ;       SYSTEM CODE ARE OK.
        ;
        ;       B.) OPERATE NO/GO RELAY OTHERWISE
        ;
        ; "FAITH, HERE'S AN EQUIVOCATOR, THAT COULD SWEAR
        ;  IN BOTH THE SCALES AGAINST EITHER SCALE;
        ;  WHO COMMITTED TREASON ENOUGH FOR GOD'S SAKE,
```

```
; YET COULD NOT EQUIVOCATE TO HEAVEN.
;
; O, COME IN, EQUIVOCATOR."
;
;
0105 96  EQUIV:  LDAA   FPROM    ;CHECK FOR DM OPTION
0107 84          ANDA   #O.DM
0109 27          BEQ    EQDN
         ;
010B 96          LDAA   FPROM    ;CHECK IF IDEK ENTRY OK
010D 84          ANDA   #O.IDEK
010F 27          BEQ    EQS
0111 BD          JSR    COMBIN
0114 24          BCC    CATOR
         ;
0116 96  EQS:    LDAA   DIGTAB+5  ;CHECK SYSTEM CODE
0118 48          ASLA
0119 48          ASLA
011A 48          ASLA
011B 48          ASLA
011C 9A          ORAA   DIGTAB+6
011E 91          CMPA   S.SYS
0120 26          BNE    CATOR
         ;
0122 BD          JSR    OPEN     ;ACTIVATE GO RELAY
         ;              ;AND START TIMER
0125 39          RTS
         ;
0126 BD  CATOR:  JSR    NGON     ;ACTIVATE NG RELAY
         ;              ;AND START TIMER
         ;
0129 39  EQDN:   RTS
         ;
         ;
         ;
```

```
        ;  OPEN
        ;
        ;
        ;  STARTS DOOR OPEN SEQUENCE.
        ;  TURNS ON ALARM SHUNT, WAKES UP GOON TO TURN
        ;  ON GO RELAY AFTER 50 MILLISECOND DELAY.
        ;
012A 96  OPEN:   LDAA   UNLFLG  ;DOOR MUST BE LOCKED
012C 27          BEQ    OPN     ;00 OR FF
012E 43          COMA
012F 26          BNE    OPEND
        ;
0131 96  OPN:    LDAA   FPROM   ;CHECK 'AS' OPTION,LEAVE
0133 84          ANDA   #O.AS   ;RELAY OFF UNLESS IN
0135 27          BEQ    OPENS
        ;
0137 86          LDAA   #R.AS   ;TURN ON 'AS' RELAY
0139 BD          JSR    RLYON
        ;
013C BD  OPENS:  JSR    NOTIME  ;TURN OFF CONFLICTING TIMERS
013F CE          LDX    #T.50MS ;WAKE UP GOON IN 50 MS
0142 DF          STX    OPCNTR
        ;
0144 39  OPEND:  RTS
        ;
        ;
        ;        GOON
        ;
        ;        TURN ON GO RELAY
        ;        ENABLE EITHER GOOFF OR GXOFF TO
        ;        TURN IT OFF LATER
        ;
        ;        "COME IN, TAILOR. HERE YOU MAY ROAST YOUR GOOSE."
        ;
        ;
```

```
0145 86  GOON:   LDAA   #R.GO    ;ACTIVATE RELAY
0147 BD          JSR    RLYON
         ;
014A CE          LDX    #GOCNTR ;SET DELAY ACORDING
014D 96          LDAA   S.VTD   ;TO VTD SWITCHES IF
014F 84          ANDA   #$0F    ;VTD NOT ZERO
0151 27          BEQ    GOONX
0153 BD          JSR    CALCT
0156 39          RTS
         ;
0157 86  GOONX:  LDAA   #$FF    ;WHEN VTD IS ZERO,
0159 97          STAA   GXCNTR  ;ENABLE ROUTINE TO
015B 97          STAA   GXCNTR+1 ;CLOSE GO RELAY AS SOON
         ;              ;AS CARD IS REMOVED
015D 39  GOOND:  RTS
         ;
         ;
         ;  GOOFF
         ;
         ; "I PRAY YOU, REMEMBER THE PORTER"
         ;
         ; WHEN 'GO' RELAY TIMES OUT, WE MUST KEEP
         ; THE AS RELAY CLOSED AWHILE LONGER
         ; TIME SPECIFIED BY THE AS/DOD SWITCHES
         ;
015E 86  GOOFF:  LDAA   #R.GO
0160 BD          JSR    RLYOFF  ;CLOSE 'GO' RELAY
         ;
0163 96          LDAA   S.AS            ;READ AS/DOD SWITCHES
0165 44          LSRA
0166 44          LSRA
0167 44          LSRA
0168 44          LSRA
0169 4C          INCA   ;AS=0 MEANS SHORTEST TIME
016A 48          ASLA
```

```
          ;
          ;  AT THIS POINT, AC CONTAINS 000XXXX0
          ;
016B CE             LDX     #ASCNTR ;LOAD 'AS' COUNTER
016E BD             JSR     CALCT   ;ACCORDING TO SWITCHES
          ;
0171 39             RTS
          ;
          ;
          ;         NGON
          ;
          ;
          ;         TURN ON NG RELAY, SET DELAY COUNTER
          ;
          ;         "GO AWAY KID--YOU BOTHER ME"
          ;
          ;
0172 96   NGON:     LDAA    FPROM   ;CHECK FOR OPTION
0174 84             ANDA    #O.NG
0176 27             BEQ     NGOND
          ;
0178 86             LDAA    #R.NG   ;TURN ON RELAYS
017A BD             JSR     RLYON
          ;
017D CE             LDX     #NGCNTR ;READ VTD, SET
0180 96             LDAA    S.VTD   ;NGCNTR ACCORDINGLY
0182 84             ANDA    #$0F
0184 27             BEQ     NGONX
0186 BD             JSR     CALCT
0189 39             RTS
          ;
018A 86   NGONX:    LDAA    #$FF    ;IF VTD IS ZERO, RELAY
018C 97             STAA    NXCNTR  ;IS ACTIVATED UNTIL
018E 97             STAA    NXCNTR+1 ;CARD IS PULLED
          ;
```

```
        ;
        ;
        ;
        ;       GXOFF
        ;
        ;
        ;       CHECKS IF CARD STILL IN SLOT.
        ;       IF NOT, DISABLES GO IMMEDIATELY
        ;       IF SO, WAKES ITSELF UP ON NEXT CLOCK.
        ;
        ;       "I'LL DEVIL PORTER IT NO LONGER"
        ;
        ;
        GXOFF   =       *
0191 96         LDAA    BUFB    ;CHECK FOR CARD
0193 84         ANDA    #01
0195 26         BNE     STILL
        ; KEEP IT ON IF A.S. BUTTON IS PUSHED
0197 96         LDAA    S.XXX
0199 34         ANDA    #X.AS
019B 27         BEQ     STILL
        ; GO CLOSE GO AND THEN AS RELAYS
019D 7E         JMP     GOOFF
        ; HERE IF WE WANT TO STAY OPEN
01A0 86 STILL:  LDAA    #$FF    ;WAKE ME UP AT
01A2 97         STAA    GXCNTR  ;NEXT CLOCK TICK
01A4 97         STAA    GXCNTR+1
01A6 39 GXD:    RTS
        ;
        ;
        ;  NXOFF
        ;
        ;
        ;  CHECKS IF CARD STILL IN SLOT.
        ;  IF NOT, DEACTIVATES NG IMMEDIATELY
```

```
        ;  IF SO, WAKES ITSELF UP ON NEXT CLOCK
        ;
01A7 96 NXOFF:  LDAA    BUFB    ;CHECK FOR CARD
01A9 84         ANDA    #$01
01AB 26         BNE     NCRD
        ;
01AD 86         LDAA    #R.NG   ;CLOSE RELAY
01AF BD         JSR     RLYOFF
01B2 39         RTS
        ;
01B3 86 NCRD:   LDAA    #$FF    ;WAKE SELF UP ON
01B5 97         STAA    NXCNTR  ;ON NEXT CLOCK TICK
01B7 97         STAA    NXCNTR+1
        ;
01B9 39 NXD:    RTS
        ;
        ;
        ; C.UNLK        UNLOCK THE DOOR AND LEAVE IT UNLOCKED
        ;
        ;  "I HAD THOUGHT TO HAVE LET IN SOME OF ALL
        ;       PROFESSIONS THAT GO THE PRIMROSE WAY
        ;       TO THE EVERLASTING BONFIRE."
        ;
        ; WE MUST:      SET THE UNLFLG
        ;               TURN ON THE AS RELAY
        ;               THEN TURN ON THE GO RELAY VIA UNON
        ;
        C.UNLK  = *
01BA BD         JSR     ACK     ;THIS IS AN IMPERATIVE
        ;
01BD 96         LDAA    FPROM
01BF 84         ANDA    #O.IMP
01C1 27         BEQ     NUTS
        ;
01C3 86         LDAA    #$01
```

```
01C5 97            STAA    UNLFLG          ;MARK DOOR AS UNLOCKED
01C7 96            LDAA    FPROM
01C9 84            ANDA    #O.AS   ;SHOULD WE BOTHER WITH AS?
01CB 27            BEQ     UNS
          ;
01CD 86            LDAA    #R.AS   ;YES
01CF BD            JSR     RLYON
01D2 BD   UNS:     JSR     NOTIME  ;TURN OFF EVERYBODY ELSE
01D5 CE            LDX     #T.50MS ;50 MS DELAY
01D8 DF            STX     UNCNTR  ;WAKE UP UNON
01DA 39   NUTS:    RTS
          ;
          ;  UNON
          ;
          ;  "ANON, ANON!"
          ;
          ;  HERE WHEN THE AS RELAY HAS SETTLED
          ;  50 MS AFTER C.UNLK
          ;
          UNON     =       *
01DB 86            LDAA    #R.GO
01DD 7E            JMP     RLYON
          ;
          ;
          ; LOCK THE DOOR  (AFTER AN UNLK)
          ;
          C.LOCK   =       *
01E0 BD            JSR     ACK
          ;
01E3 96            LDAA    FPROM   ;CHECK OPTION
01E5 84            ANDA    #O.IMP
01E7 27            BEQ     NUTS
          ;
01E9 86            LDAA    #$FF
01EB 97            STAA    UNLFLG  ;SHOW THAT WE ARE LOCKED
```

```
01ED 7E          JMP     GOOFF   ;LET SOMEBODY ELSE DO ALL OF
         ; THE WORK, I.E. TURN OFF GO THEN AS
         ;
         ;
         ; NOTIME TURNS OFF A WHOLE SLEW OF COUNTERS
         ; CALL HERE WHEN YOU START A 'GO SEQUENCE'
         ; SO THAT YOUR PREDECESSORS CANNOT INTERFERE WITH YOU
         ;
01F0 CE  NOTIME: LDX     #0
01F3 DF          STX     EQCNTR
01F5 DF          STX     GXCNTR
01F7 DF          STX     ASCNTR
01F9 DF          STX     GOCNTR
01FB DF          STX     OPCNTR
01FD 39          RTS
         ;
         ;       RLYOFF
         ;
         ;
         ;       RLYOFF CLOSES THE RELAY INDICATED
         ;       BY MASK IN ACCUM A
         ;
         ;
01FE 9A  RLYOFF: ORAA    BUFB
0200 97          STAA    BUFB
         ;
0202 39          RTS
         ;
         ;
         ;       RLYON   ;TURNS ON A RELAY
         ;               ;BIT MASK E.G. $80 IN AC A
         ;
0203 43  RLYON:  COMA
0204 94          ANDA    BUFB
0206 97          STAA    BUFB
```

```
0208 39          RTS
          ;
          ;
          ;        DMSET
          ;
          ;
          ;
          ;        PUT SYSTEM INTO DEGRADED MODE WHEN
          ;        DGCNTR TIMES OUT. SHOULD ONLY
          ;        HAPPEN IF NO CONSOLE TRAFFIC FOR
          ;        OVER 30 SECONDS.
          ;
          ; "IF A MAN WERE PORTER OF HELL GATE,
          ;  HE SHOULD HAVE OLD OF TURNING THE KEY."
          ;
0209 86  DMSET:  LDAA    #$FF
020B 97          STAA    DMFLG
          ; LOCK THE DOOR
020D 7F          CLR     UNLFLG  ;SHOW THAT IT IS LOCKED
          ;        ;NOTE!>>> THIS STOMPS THE FLAG INTO THE REPORTED
                    STATE!!!!
0210 7E          JMP     GOOFF
          ;
          ;
          ;
          ;        CALCT
          ;
          ;
          ;
          ;        CALCULATE TIMER CONSTANT FROM VALUE
          ;        IN ACCUM A. ACCUM A CONTAINS TIME IN SECONDS,
          ;        X POINTS TO TIMER.
          ;
          ;
0213 C6  CALCT:  LDAB    #$FF    ;SET TIMER TO MINIMUM VALUE
```

```
0215 E7            STAB    0,X
0217 E7            STAB    1,X
0219 4D            TSTA                ;ZERO SECONDS IS A SPECIAL CASE
021A 27            BEQ     CALCTX
          ;
021C E6  CALCTL:   LDAB    1,X         ;SUBTRACT ONE SECOND
021E C0            SUBB    #-T.01S     ;EACH TIME THRU LOOP
0220 E7            STAB    1,X
0222 E6            LDAB    0,X
0224 C2            SBCB    #$00
0226 E7            STAB    0,X
          ;
0228 4A            DECA                ;GO THRU LOOP UNTIL
0229 26            BNE     CALCTL      ;ACCUM A COUNTED OUT
022B 39  CALCTX:   RTS                 ;RETURN WITH TIMER
          ;                ;CONST. IN X

                ;
                ;       KEYSER
                ;
                ;
                ;       MAIN KEYBOARD SERVICE ENTRY,
                ;       CALL HERE AT RTC TO CHECK KEYBOARD
                ;       CONTINUALLY SHOVES NEW KEYS INTO KEYTAB
                ;       CALLS DEBOUNCE AND STASH ETC..
                ;
                ;
        022CP   KEYSER  =       *
022C BD 0236            JSR     DB      ;WHAT HAS BEEN PUSHED?
022F 4D                 TSTA            ;FF MEANS NOTHING
0230 2B 03 =            BMI     NOKEY
0232 BD 0251            JSR     STASH   ;PUT INTO MEMORY
                ;
0235 39         NOKEY:  RTS
                ;
```

```
                ;
                ;       DEBOUNCE
                ;
                ; RETURNS # OF KEY IN AC A
                ; RETURNS FF IF NO NEW KEYS THIS TIME
                ;
                ; USES SUBR KEYSCAN
                ;
      0236P     DB      =       *
0236 BD 0278            JSR     KEYSCN  ;GET NEW KEY IN B
0239 96 27Z             LDAA    OLDKEY
023B D7 27Z             STAB    OLDKEY          ;SAVE THIS # FOR NEXT
                                                 TIME
                ;               ;A CONTAINS ONLY COPY OF OLD ONE
023D 11                 CBA
023E 27 06 =            BEQ     OLDIE
                ; HERE IF WE SEE KEY FOR FIRST TIME
0240 7F 0026            CLR     KEYFLG
0243 86 FF              LDAA   #$FF             ;DON'T ASSIMILATE
                                                 UNTIL LATER
0245 39                 RTS
                ; HERE IF SEEN AT LEAST ONCE BEFORE
0246 D6 26Z     OLDIE:  LDAB    KEYFLG
0248 27 03 =            BEQ     GOODIE
                ; HERE IF SEEN MANY TIMES
024A 86 FF              LDAA    #$FF
024C 39                 RTS
                ;
024D 7A 0026    GOODIE: DEC     KEYFLG          ;NO LONGER VIRGIN
0250 39                 RTS             ;KEY # IN AC A STILL
                ;
                ;
                ;       STASH   ;PROCESS KEYBOARD CHARS
                ;
                ; IF A NUM, SLIDES IT INTO KEYTAB
```

```
                ; AND INCREMENTS KEYCNT
                ; IF CANCEL, CLEARS KEYTAB AND KEYCNT
                ; IF DURESS, SETS DURESF FLAG
                ; NOTE THAT CANCEL AND DURESS DO NOT GO INTO MEMORY
                ;
                ; CALLED WITH CHAR IN AC A
                ;
          0251P STASH   =       *
                ; FIRST FOR THE SPECIAL CHECKS
                ;
0251 81 0A              CMPA    #$0A            ;DURESS CHARACTER
0253 27 20 =            BEQ     DURKEY
0255 81 0B              CMPA    #$0B    ;CANCEL CHAR
0257 27 12 =            BEQ     CANCEL
                ; HERE IF IT MUST BE A VALID NUMERAL
                ; SLIDE OLD DATA DOWN TO MAKE ROOM
                ;
0259 D6 22Z             LDAB    KEYTAB+2
025B D7 23Z             STAB    KEYTAB+3
025D D6 21Z             LDAB    KEYTAB+1
025F D7 22Z             STAB    KEYTAB+2
0261 D6 20Z             LDAB    KEYTAB+0
0263 D7 21Z             STAB    KEYTAB+1
                ; NOW INSERT THE NEW ONE
0265 97 20Z             STAA    KEYTAB+0
0267 7C 0024            INC     KEYCNT
026A 39                 RTS
                ;
          026BP CANCEL  =       *
                ; CLEAR DATA AND COUNT
                ; ASSUMES THEY ARE CONSECUTIVE
                ;
026B 4F                 CLRA
026C CE 0005            LDX     #$05            ;FOUR DIGITS AND ONE
                                                 COUNT
```

```
026F A7 1FZ   CANL:    STAA    KEYTAB-1,X
0271 09                DEX
0272 26 FB =           BNE     CANL
0274 39 .              RTS               ;DO NOT STORE ARGUMENT
                ;
        0275P  DURKEY  =       *
0275 97 25Z            STAA    DURESF            ;MAKE FLAG NON-ZERO
0277 39                RTS
                ;
                ;
                ;      KEYSCAN
                ;
                ; TELLS WHAT KEY IS DOWN
                ; ANSWER IS IN AC B
                ; O THROUGH 11 DESIGNATES KEY
                ; FF MEANS NO KEYS PUSHED
                ;
        0278P  KEYSCN  = *
0278 5F                CLRB              ;START WITH KEY O
                ;
                ; DETERMINE WHAT ROW THE KEY IS IN
                ;
0279 96 EO             LDAA    ROWO
027B 43                COMA
027C 84 FO             ANDA    #$FO      ;UNUSED BITS
027E 26 15 =           BNE     GOTIT
0280 CB 04             ADDB    #4                ;NEXT ROW STARTS WITH
                                                  KEY 4
                ;
0282 96 E1             LDAA    ROWO+1
0284 43                COMA
0285 84 FO             ANDA    #$FO
0287 26 OC =           BNE     GOTIT
0289 CB 04             ADDB    #4
                ;
```

```
028B 96 E2            LDAA    ROW0+2
028D 43               COMA
028E 84 F0            ANDA    #$F0
0290 26 03 =          BNE     GOTIT
            ; HERE IF NOW ROWS HAVE KEYS DOWN
0292 C6 FF            LDAB    #$FF
0294 39               RTS
            ;
            ; NOW TO DETERMINE WHICH OF THE FOUR COLUMNS IT IS
            ; AT THIS POINT, B CONTAINS 0, 4, OR 8
            ; AND A CONTAINS A 'ONE-OF-FOUR' CODE IN THE MSB'S
            ; THE CODE FOR KEY 0 IS 10; KEY 1 IS 20, ETC.
            ;
        0295P  GOTIT  =       *
0295 44               LSRA
0296 44               LSRA
0297 44               LSRA
0298 44               LSRA
            ; NOW CODE IS THE THE FOUR LSB'S
0299 44     KEYSL:    LSRA            ;PUT A BIT INTO CARRY FLAG
029A 25 03 =          BCS     DONE    ;IF A ONE, THEN WE'RE THROUGH
029C 5C               INCB            ;NOPE...GO TO NEXT BIT
029D 20 FA =          BRA     KEYSL   ;LOOP UNTIL FIND ONE
            ; NOTE THAT WE ARE GUARANTEED THAT AC IS NON-ZERO!!!
            ; SO WE CAN'T LOOP FOREVER
            ;
029F 39     DONE:     RTS
            ;
            ;
            ;
            ;
            ;  END OF FOREGROUND MODULE
            ;
            ;
```

```
02A0          CPYRGT: BYTE    "COPYRIGHT (C)  1976 "
02B4                  BYTE    "RUSCO ELECTRONIC SYSTEMS "
02CD                  BYTE    "GLENDALE, CALIFORNIA "
       02E2P  FOREND  =        *
              ;
              ;
              ;
              ;  BACK
              ;
              ;
              ;  THIS IS THE CONTROLLING PROGRAM FOR THE
              ;  BACKGROUND TASKS.  MOST OF THE EXECUTION
              ;  TIME OF THE PROCESSOR IS SPENT IN THIS
              ;  ROUTINE CHECKING STATUS BITS
              ;  AND WAITING TO BEGIN ONE OF SEVERAL
              ;  BACKGROUND TASKS.  THE FOLLOWING
              ;  TASKS ARE INITIATED FROM THIS ROUTINE:
              ;
              ;       1.  INITIATE RESPONSE TO CONSOLE INQUIRY
              ;       OR COMMAND.
              ;
              ;       2.  CHECK FOR CARD AND PERFORM ONE OR
              ;       MORE OF THE FOLLOWING TASKS, AS
              ;       APPROPRIATE:
              ;
              ;               A.  IF IN DEGRADED MODE, INITIATE
              ;               DEGRADED ENTRY SEQUENCE.
              ;
              ;               B.  IF IDEK, INITIATE IDEK KEYBOARD
              ;               SCANNING SEQUENCE.
              ;
              ;               C.  IF ELEVATOR, INITIATE FLOOR
              ;               KEYBOARD SCANNING SEQUENCE.
              ;
```

```
02E2 8E 0068  BACK:  LDS   #$0068        ;INIT STACK PTR
02E5 BD 0327         JSR   IOSET  ;INITIALIZE I/O DEVICES
              ;
02E8 BD 0314         JSR   CLRRAM ;INITIALIZE MACHINE STATE
              ;
02EB BD 03E4         JSR   ILKL   ;INIT TO IDEK LOCAL
02EE 86 FE           LDAA  #$FE   ;FLAG LOCAL,REPORTED
02F0 97 1CZ          STAA  LCLFLG
              ;
02F2 86 FC           LDAA  #$FC   ;ENABLE ALL FEATURES
02F4 97 80           STAA  FPROM  ;WHILE DEBUGGING
02F6 86 FF           LDAA  #$FF
02F8 97 81           STAA  FPROM+1
              ;
02FA BD 031D         JSR   DMCLR  ;CLR DEGRADED MODE
              ;
02FD                 PION                ;TURN ON INTERRUPTS
              ;
02FE 86 34    ALOOP: LDAA  #$34   ;CLR DEAD MAN
0300 97 A5           STAA  CSRA
              ;
0302 96 1EZ   CHKDM: LDAA  DMFLG  ;CHECK FOR DEGRADED MODE
0304 27 03 =         BEQ   CHKPL
0306 BD 05B2         JSR   DMSCAN
              ;
0309 86 01    CHKPL: LDAA  #01    ;WAIT FOR CONSOLE COMMAND
030B 94 A8           ANDA  ACSTAT
030D 27 EF =         BEQ   ALOOP
030F BD 034E         JSR   COMCON
0312 20 EA =         BRA   ALOOP
              ;
              ;
              ;
              ;  CLRRAM
              ;
```

```
                ;
                ;  CLEARS ALL RAM FROM 0000 TO 0050
                ;  USED TO INIT RAM ON STARTUP
                ;
0314 CE 0050   CLRRAM: LDX     #$50
0317 6F 00     CLRRML: CLR     0,X
0319 09                DEX
031A 26 FB =           BNE     CLRRML
031C 39                RTS
                ;
                ;
                ;
                ;  DMCLR
                ;
                ;
                ;  CLEARS DEGRADED MODE AND INITIALIZES
                ;  DEGRADED MODE COUNTER TO TIME OUT IN
                ;  30 SECONDS
                ;
031D 86 00     DMCLR:  LDAA    #$00     ;CLEAR DM FLAG
031F 97 1EZ            STAA    DMFLG
                ;
0321 CE EE6C           LDX     #T.30S   ;30 SEC DELAY
0324 DF 00Z            STX     DMCNTR
                ;
0326 39                RTS
                ;
                ;
                ;
                ; I/O INITIALIZATION ROUTINES
                ;
                ;
0327 7F 00A5   IOSET:  CLR     CSRA     ;ROUTING BIT=0 MEANS DDRS
032A 7F 00A7           CLR     CSRB
032D 86 FF             LDAA    #$FF     ;1 MEANS OUTPUT
```

```
032F 97 A4          STAA    BUFA
0331 86 FE          LDAA    #$FE            ;ONE INPUT FCR CARDIN
0333 97 A6          STAA    BUFB
               ; SET CA2 TO 'MANUAL', LOW=BG, HIGH=FG
               ;        (FOR DEADMAN)
               ; SET CA1 TO REACT TO FALLING EDGE OF COIL DATA
0335 86 34          LDAA    #$34            ;$3C FOR FOREGROUND
0337 97 A5          STAA    CSRA
               ; CB2 REACTS TO THE RISING EDGE OF RTC
               ; CB1 IS UNUSED
0339 86 0E          LDAA    #$0E
033B 97 A7          STAA    CSRB
               ; NOW SET INITAL VALUES
               ; NO COILS SELECTED, NO RELAYS ON
033D 86 F0          LDAA    #$F0
033F 97 A4          STAA    BUFA
0341 86 F8          LDAA    #$F8
0343 97 A6          STAA    BUFB
               ;
               ; NOW TO INITIALIZE THE ACIA
               ;
0345 86 FF          LDAA    #$FF            ;*****TOTAL RESET*****
               ;********* NOTE:       THIS DESTROYS ANY CHARS IN
                                     TRANSMISSION********
0347 97 A8          STAA    ACSTAT
0349 86 16          LDAA    #$16            ;EIGHT BIT CHARS,
                                             1/64 MODE
034B 97 A8          STAA    ACSTAT
034D 39        RTS2:  RTS
               ;
               ;
               ; COMCON
               ;
               ; PROCESS COMMAND FROM CONSOLE
               ; SHOULD BE CALLED IFF THER IS A CHAR IN THE ACIA
```

```
                ; OR POSSIBLY A FRAMING ERROR
                ;
                ; COMCON ALSO RESETS THE DM TIMER TO 30 SEC
                ;
                ; KLUDGE UP TRIVIAL ROUTINES
        034DP   C.CCAK  =       RTS2
        034DP   C.ERR   =       RTS2
        034DP   C.FE    =       RTS2
                ;
        034EP   COMCON  =       *
034E BD 0402            JSR     GETA    ;GET A CHAR FROM THE ACIA
0351 36                 PSHA
0352 81 80              CMPA    #$80    ;FRAMING ERROR
0354 27 03 =            BEQ     *+5
0356 BD 031D            JSR     DMCLR
0359 32                 PULA
                ; NOW TURN CHAR INTO INDEX TO COMTAB
035A 44                 LSRA
035B 44                 LSRA
035C 44                 LSRA
035D 44                 LSRA
035E 48                 ASLA    ;2 BYTES PER ADDRESS
                ; AT THIS POINT A CONTAINS 000XXXX0
035F 97 44Z             STAA    XREG1+1 ;LSB (OFFSET)
0361 86 ??              LDAA    #MSB COMTAB
0363 97 43Z             STAA    XREG1   ;MSB TABLE ADDRESS
0365 DE 43Z             LDX     XREG1
                ; NOW VECTOR THROUGH TABLE TO THE 'SERVICE ROUTINE'
0367 EE ??              LDX     LSB COMTAB,X    ;LSB OF TABLE BASE ADDR
0369 AD 00              JSR     0,X
036B 39                 RTS
                ;
        036CP   COMTAB  =       *
036C                    WORD    C.POLL,C.CCAK,C.ERR,C.ERR
0374                    WORD    C.ERR,C.NG,C.GO,C.ERR
```

```
037C                    WORD    C.FE,C.NG.A,C.GO.A,C.LOCK
0384                    WORD    C.UNLK,C.IC,C.ICK,C.ILCL
                ;
                ;
                ; C.GO  GO WITHOUT ACKNOWLEGE
                ;
                ;
038C 96 A6      C.GO:   LDAA    BUFB    ;DO NOTHING IF
038E 84 01              ANDA    #$01            ;CARD NOT STILL IN READEI
0390 27 03 =            BEQ     RTS1
0392 BD 012A            JSR     OPEN            ;BEGIN DOOR OPEN SEQUENCI
0395 39         RTS1:   RTS
                ;
                ;
                ; C.GO.A        GO WITH ACK
                ;
        0396P   C.GO.A  =       *
0396 BD 03FC            JSR     ACK
                ;
0399 96 80              LDAA    FPROM
039B 84 08              ANDA    #O.IMP
039D 27 F6 =            BEQ     RTS1
                ;
039F BD 012A            JSR     OPEN            ;SAME AS GO.A
03A2 39                 RTS
                ;
                ;
                ; C.NG  ACTIVATE THE NG RELAY
                ;               NO ACK
                ;
        03A3P   C.NG    =       *
                ; THE CONSOLE IS NOT EQUIVOCATING
03A3 CE 0000            LDX     #0
03A6 DF 10Z             STX     EQCNTR
                ; DO NOTHING IF CARD NOT STILL IN READER
```

```
03A8 96 A6              LDAA    BUFB
03AA 84 01              ANDA    #$01
03AC 27 E7 =            BEQ     RTS1
03AE BD 0172            JSR     NGON          ;START THE NG SEQUENCE
03B1 39                 RTS
                ;
                ;
                ;  C.NG.A        NOGO    WITH ACK
                ;
         03B2P  C.NG.A  =       *
03B2 BD 03FC            JSR     ACK
                ;
03B5 96 80              LDAA    FPROM
03B7 84 08              ANDA    #O.IMP
03B9 27 DA =            BEQ     RTS1
                ;*
03BB BD 0172            JSR     NGON    ;ACTIVATE THE NG RELAY
03BE 39                 RTS
                ;
                ;
                ;
                ;  C.IC
                ;
                ;
                ;  COMMAND IDEK READER TO NO KEYBOARD MODE
                ;
03BF 96 81      C.IC:   LDAA    FPROM+1 ;CHK FOR IDEK OVERRIDE
03C1 84 80              ANDA    #O.IDO  ;OPTION
03C3 27 33 =            BEQ     NOIDO
                ;
03C5 86 01              LDAA    #$01    ;SET NO KBD MODE
03C7 97 1BZ             STAA    KBDFLG
03C9 20 29 =            BRA     NOLCL
                ;
                ;
```

```
                ;  C.ICK
                ;
                ;
                ;  COMMAND IDEK READER TO KEYBD MODE
                ;
03CB 96 81      C.ICK:  LDAA    FPROM+1 ;CHECK FOR IDEK OVERRIDE
03CD 84 80              ANDA    #O.IDO  ;OPTION
03CF 27 27 =            BEQ     NOIDO
                ;
03D1 86 FF              LDAA    #$FF    ;SET KBD MODE
03D3 97 1BZ             STAA    KBDFLG
03D5 20 1D =            BRA     NOLCL
                ;
                ;
                ;  COMMAND READER TO GO TO LOCAL MODE
                ;
                ;
                ;
     03D7P      C.ILCL  =       *
03D7 96 81              LDAA    FPROM+1
03D9 84 80              ANDA    #O.IDO
03DB 27 1B =            BEQ     NOIDO   ;OPTION NOT IN
                ;
03DD BD 03FC            JSR     ACK
03E0 86 01              LDAA    #$01    ;LOCAL, NOT YET REPORTED
03E2 97 1CZ             STAA    LCLFLG
                ;
                ; JSR HERE TO SET CARD/CARD+KEYBOARD
                ; ACCORDING TO LOCAL SWITCH
03E4 96 C3      ILKL:   LDAA    S.IDEK  ;CHECK SWITCH
03E6 84 01              ANDA    #$01
03E8 27 05 =            BEQ     NKB
                ;
03EA 86 00              LDAA    #$00    ;FORCE KEYBD,REPORTED
03EC 97 1BZ             STAA    KBDFLG
```

```
03EE 39                 RTS
                ;
03EF 86 FE      NKB:    LDAA    #$FE     ;FORCE NO KBD,REPORTED
03F1 97 1BZ             STAA    KBDFLG
03F3 39                 RTS
                ;
                ;  NOLCL
                ;
                ;
                ;  COMMAND RDR OFF LOCAL MODE
                ;
03F4 86 00      NOLCL:  LDAA    #$00
03F6 97 1CZ             STAA    LCLFLG
03F8 BD 03FC    NOIDO:  JSR     ACK
03FB 39                 RTS
                ;
                ;
                ;  ACK
                ;
                ;
                ;  SEND AN ACKNOWLEDGE CHARACTER TO CONSOLE
                ;
03FC 86 10      ACK:    LDAA    #$10
03FE BD 0414            JSR     PUTA
0401 39                 RTS
                ;
                ;
                ; GETA  GET A CHARACTER FROM THE ACIA
                ; RETURNS CHAR IN AC A
                ; RETURNS 80 IF NO CHAR READY, OR ERROR
                ;*
        0402P   GETA    =       *
0402 96 A8              LDAA    ACSTAT
0404 85 01              BITA    #$01            ;READY????
0406 27 09 =            BEQ     ACBAD
```

```
0408 85 30              BITA    #$30           ;ERROR???
040A 26 03 =            BNE     ACJUNK
040C 96 A9              LDAA    ACDATA
040E 39                 RTS
                ;
040F 96 A9      ACJUNK: LDAA    ACDATA  ;GET RID OF OFFENDER
0411 86 80      ACBAD:  LDAA    #$80
0413 39                 RTS
                ;
                ;
                ; PUTA  OUTPUT A CHARACTER TO THE ACIA
                ; CALLED WITH A CHAR IN AC A
                ;
                ; NORMALLY CALLED WITH ACIA KNOWN TO BE 'READY'
                ; BUT WILL WAIT IF NOT READY
                ;
        0414P   PUTA    =       *
0414 36                 PSHA
                ;
0415 86 34              LDAA    #$34    ;CLR DEADMAN
0417 97 A5              STAA    CSRA
                ;
0419 96 A8      PUTL:   LDAA    ACSTAT
041B 85 02              BITA    #$02    ;XMTR READY?
041D 27 FA =            BEQ     PUTL
                ;
041F 32                 PULA
0420 97 A9              STAA    ACDATA
0422 39                 RTS
                ;
                ;***************************************************************
                 ******************
                ;
                ;               CARD READER
                ;
```

```
;****************************************************
 *******************

;

;

;       THIS SET OF ROUTINES READS THE MAGNETS,
; ASSEMBLES BITS INTO 4-BIT DIGITS
; AND STORES THEM ONE TO A WORD AT DIGTAB
;

;

0423 CE 0084   CARDRD: LDX     #SCNTAB ;POINTS AT COIL ADDRESSES
0426 DF 45Z            STX     SCNPTR
0428 CE 0031           LDX     #DIGTAB
042B DF 47Z            STX     DIGPTR  ;POINTS TO PLACE TO KEEP THE
                                        DIGITS
        042DP  CRDRDL  =       *
               ;
               ; HERE TO READ THE NEXT DIGIT OF THE CARD
               ;
               ;       LDX     DIGPTR
               ;               ;ASSUME X CONTAINS DIGPTR
042D 8C 0038           CPX     #DIGTAB+7       ;STOP AFTER 7 DIGITS
0430 26 01 =           BNE     CRDOIT
0432 39                RTS             ;ALL DIGITS ACCUMULATED
               ;
0433 C6 10     CRDOIT: LDAB    #$10            ;WILL CARRY AFTER 4
                                                ITERATIONS
        0435P  BITRDL  = *
               ; HERE TO READ ONE BIT AND INCLUDE IT IN DIGIT
               ;
0435 BD 0447           JSR     CRDSCN  ;SCAN CARD FOR BIT
0438 59                ROLB            ;ROLL CARRY BIT INTO B
0439 7C 0046           INC     SCNPTR+1        ;UPDATE BIT INDEX LSB
043C 24 F7 =           BCC     BITRDL  ;IF KLUDGEY FLAG BIT CARRIED OUT
               ; WE HAVE A DIGIT
               ; STORE IT IN RAM
```

```
                   ;
043E DE 47Z            LDX     DIGPTR
0440 E7 00             STAB    0,X
0442 08                INX             ;UPDATE STROAGE POINTER
0443 DF 47Z            STX     DIGPTR  ;SAFEKEEPING IN RAM
0445 20 E6 =           BRA     CRDRDL  ;GO GET ANOTHER DIGIT
                   ;
                   ;
                   ;
                   ; CRDSCN:          CHECKS MAGNET BIT
                   ;
                   ;
                   ; CALL WITH INDEX INTO COIL ADDR TABLE IN SCNPTR
                   ; SETS CARRY BIT ACCORDING TO RESULT
                   ;
0447 86 F0         CRDSCN: LDAA  #$F0            ;CLEAR COILS
0449 97 A4             STAA  BUFA
044B 01                NOP             ;WAIT FOR COILS TO SETTLE
044C 01                NOP
044D 01                NOP
044E 96 A4             LDAA  BUFA                ;CLR PIA EDGE DETECTOR
0450 DE 45Z            LDX     SCNPTR  ;PTR FOR THIS BIT
                   ;
0452 07                TPA             ;DISABLE INTERRUPTS DUE
0453 36                PSHA            ;TO CRITICAL TIMING
0454                   PIOFF
                   ;
0455 A6 00             LDAA  0,X                 ;GET COIL ADDRESS FROM
                                                  FPROM
0457 97 A4             STAA  BUFA                ;AND TURN ON COIL
0459 01                NOP
045A 01                NOP
045B 01                NOP
045C 01                NOP
045D 01                NOP             ;WAIT FOR COIL RESPONSE
```

```
045E 01              NOP
045F 01              NOP           ;SET CARRY BIT ACCORDING TO
0460 96 A5           LDAA  CSRA         ;RESPONSE ON CRA7
0462 2B 08 =         BMI   CRDSC
                ;
0464 32              PULA          ;RESTORE INTERRUPT STATUS
0465 06              TAP
0466 86 F0           LDAA  #$F0 ;TURN OFF COILS
0468 97 A4           STAA  BUFA
046A 0D              SEC           ;NORTH SPOT--SET CARRY
046B 39              RTS
                ;
046C 32         CRDSC: PULA        ;RESTORE INTERUPT STATUS
046D 06              TAP
046E 86 F0           LDAA  #$F0 ;TURN OFF COILS
0470 97 A4           STAA  BUFA
0472 0C              CLC           ;SOUTH SPOT--CLR CARRY
0473 39              RTS
                ;
                ;*****************************************************
                 *****************
                ;
                ;
                ;  POLL HANDLER
                ;
                ;
                ;*****************************************************
                 *****************
                ;
                ;
                ;  THIS ROUTINE HANDLES ALL RESPONSES TO POLL
                ;  COMMANDS FROM THE CONSOLE.  ON RECEIPT OF
                ;  SUCH A COMMAND, THIS ROUTINE WILL ARRANGE
                ;  TO DO ONE OF THE FOLLOWING:
                ;
```

```
                ;       1.  XMIT ANY CHANGES IN CONDITION
                ;       (DOD, TAMPER, LOCK, ETC.)
                ;
                ;       2.  IF NO CONDITION CHANGES AND THERE
                ;       IS A CARD IN THE READER AND ALL KEYBD
                ;       DATA REQUIRED (IF ANY) HAS BEEN
                ;       COLLECTED, XMIT CARD DATA
                ;
                ;       3.  IF NO CONDITION CHANGES AND NOT READY
                ;       WITH CARD DATA, TRANSMIT A POLL ACK
                ;       CHARACTER
                ;
                ;  NOTE THAT ONLY ONE CONDITION CHANGE OR
                ;  CARD-IN MESSAGE CAN BE SENT PER POLL.
                ;  CONDITION CHANGES HAVE PRIORITY OVER
                ;  CARD DATA, AND ARE THEMSELVES ORDERED
                ;  ACCORDING TO PRIORITY.
                ;
       0474P    C.POLL  =       *
                ;
                ;  CHECK TAMPER SWITCH CONDITION CHANGE
                ;
0474 96 18Z     FTAMP:  LDAA    TMPFLG  ;NOTE TAMPER SWITCH
0476 81 01              CMPA    #$01    ;OPEN TRANSITION
0478 26 08 =            BNE     FTAMP1
047A 86 FE              LDAA    #$FE
047C 97 18Z             STAA    TMPFLG
047E 86 80              LDAA    #$80
0480 20 64 =            BRA     XMITC
                ;
0482 81 FF      FTAMP1: CMPA    #$FF    ;NOTE TAMPER SWITCH
0484 26 07 =            BNE     FDOD    ;CLOSED TRANSITION
0486 7F 0018            CLR     TMPFLG
0489 86 80              LDAA    #$80
048B 20 59 =            BRA     XMITC
                ;
```

```
                  ;
                  ;  CHECK DOOR TO SEE IF OPEN OR CLOSED
                  ;
048D 96 19Z       FDOD:   LDAA    DODFLG
048F 81 01                CMPA    #$01     ;HAS DOOR BEEN OPENED?
0491 26 08 =              BNE     FDOD1
0493 86 FE                LDAA    #$FE
0495 97 19Z               STAA    DODFLG   ;SHOW IT'S BEEN REPORTED
0497 86 20                LDAA    #$20
0499 20 4B =              BRA     XMITC
                  ;
049B 81 FF        FDOD1:  CMPA    #$FF
049D 26 07 =              BNE     FUNK     ;HAS DOOR BEEN CLOSED?
049F 7F 0019              CLR     DODFLG   ;SHOW IT'S BEEN REPORTED
04A2 86 10                LDAA    #$10
04A4 20 40 =              BRA     XMITC
                  ;
                  ;  CHECK DOOR FOR LOCK OR UNLOCK
                  ;
04A6 96 1AZ       FUNK:   LDAA    UNLFLG
04A8 81 01                CMPA    #$01     ;HAS DOOR BEEN UNLOCKED?
04AA 26 08 =              BNE     FLOCK
04AC 86 FE                LDAA    #$FE
04AE 97 1AZ               STAA    UNLFLG
04B0 86 40                LDAA    #$40
04B2 20 32 =              BRA     XMITC
                  ;
04B4 81 FF        FLOCK:  CMPA    #$FF     ;HAS DOOR BEEN LOCKED?
04B6 26 07 =              BNE     FKBD
04B8 7F 001A              CLR     UNLFLG
04BB 86 30                LDAA    #$30
04BD 20 27 =              BRA     XMITC
                  ;
                  ;
                  ;  IDEK CONDITION CHANGES
                  ;
```

```
04BF 96 1BZ   FKBD:   LDAA    KBDFLG
04C1 81 01            CMPA    #$01     ;GONE CARD ONLY?
04C3 26 08 =          BNE     FKBD1
04C5 86 FE            LDAA    #$FE
04C7 97 1BZ           STAA    KBDFLG
04C9 86 50            LDAA    #$50
04CB 20 19 =          BRA     XMITC
              ;
04CD 81 FF    FKBD1:  CMPA    #$FF     ;GONE CARD+KEYBOARD?
04CF 26 07 =          BNE     FLCL
04D1 7F 001B          CLR     KBDFLG
04D4 86 60            LDAA    #$60
04D6 20 0E =          BRA     XMITC
              ;
04D8 96 1CZ   FLCL:   LDAA    LCLFLG
04DA 81 01            CMPA    #$01     ;HAS IDEK GONE LOCAL?
04DC 26 1D =          BNE     FCARD
04DE 86 FE            LDAA    #$FE
04E0 97 1CZ           STAA    LCLFLG
04E2 86 70            LDAA    #$70
04E4 20 00 =          BRA     XMITC
              ;
              ;  XMITC
              ;
              ;
              ;  THIS ROUTINE SENDS THE MESSAGE NOTIFYING THE
              ;  CONSOLE OF A CONDITION CHANGE
              ;
              ;  CALLED WITH CONDITION CHANGE CODE IN A
              ;
              ;
04E6 36       XMITC:  PSHA             ;SAVE ACC A
              ;
04E7 96 81            LDAA    FPROM+1  ;XMIT DEVICE TYPE
04E9 48               ASLA
```

```
04EA 48                  ASLA
04EB 48                  ASLA
04EC 48                  ASLA
04ED BD 0414             JSR     PUTA
                ;
04F0 32                  PULA              ;XMIT CHANGE CODE
04F1 BD 0414             JSR     PUTA
                ;
04F4 39                  RTS
                ;
                ;
                ;
                ;  PACK
                ;
                ;
                ;  ROUTINE TO SEND ACKNOWLEDGE CHARACTER
                ;  TO CONSOLE IF NOTHING WORTH REPORTING
                ;  HAS HAPPENED.
                ;
04F5 86 FF      PACK:    LDAA    #$FF
04F7 BD 0414             JSR     PUTA
04FA 39                  RTS
                ;
                ;
                ;
                ;  FCARD
                ;
                ;
                ;  IF NO CONDITION CHANGES TO REPORT,
                ;  CHECK IF THERE IS A CARD IN READER.
                ;  IF SO, WE MUST FIGURE OUT WHAT KIND
                ;  OF A READER WE ARE AND BRANCH TO
                ;  THE APPROPRIATE SERVICE ROUTINE.
                ;
04FB 96 1FZ     FCARD:   LDAA    CRDFLG  ;CHECK IF UNPROCESSED
```

```
04FD 81 01              CMPA    #$01      ;CARD IN READER
04FF 26 F4 =            BNE     PACK      ;IF NOT, SEND ACK & QUIT
                    ;
0501 96 80              LDAA    FPROM     ;CHECK IF ELEVATOR
0503 84 02              ANDA    #O.ELEV   ;READER
0505 26 08 =            BNE     FELEV
                    ;
0507 96 80              LDAA    FPROM     ;CHECK IF IDEK RDR
0509 84 01              ANDA    #O.IDEK
050B 26 15 =            BNE     FIDEK
                    ;
050D 20 5E =            BRA     FSTAND    ;MUST BE STNDRD RDR
                    ;
                    ;
                    ;
                    ;   FELEV
                    ;
                    ;
                    ;   ACCUMULATE AND TRANSMIT ELEVATOR
                    ;   MESSAGE
                    ;
050F 96 25Z     FELEV:  LDAA    DURESF    ;QUIT IF FLOOR NUMBER
0511 27 E2 =            BEQ     PACK      ;NOT KEYED IN
                    ;
0513 BD 056D            JSR     FSTAND    ;DO STANDARD TASKS
                    ;
0516 96 21Z             LDAA    KEYTAB+1
0518 48                 ASLA
0519 48                 ASLA
051A 48                 ASLA
051B 48                 ASLA
051C 9A 20Z             ORAA    KEYTAB
051E BD 0414            JSR     PUTA      ;TRANSMIT FLOOR NUMBER
                    ;
0521 39                 RTS
                    ;
```

```
                ;
                ;
                ;  FIDEK
                ;
                ;
                ;  ACCUMULATE AND TRANSMIT IDEK MESSAGE
                ;  IN RESPONSE TO A POLL
                ;
0522 96 1BZ     FIDEK:  LDAA    KBDFLG  ;IMITATE STNDRD RDR IF
0524 26 47 =            BNE     FSTAND  ;NOT IN KBD MODE
                ;
0526 96 24Z             LDAA    KEYCNT  ;IGNORE UNTIL 4 DIGITS
0528 81 04              CMPA    #$04    ;HAVE BEEN ENTERED
052A 2B C9 =            BMI     PACK
                ;
052C 86 50              LDAA    #$50    ;XMIT HEADER BYTE
052E BD 0414            JSR     PUTA
                ;
0531 BD 0423            JSR     CARDRD  ;READ CARD
                ;
0534 BD 059A            JSR     FRTL    ;RESTART ERROR COUNT IF
                ;               ;THIS CARD NOT SAME AS LAST
                ;
0537 BD 064C            JSR     COMBIN  ;COMBINE AND PERMUTE
                ;               ;KEYBOARD ENTRY
                ;
053A 96 31Z             LDAA    DIGTAB  ;GET FIRST DATA DIGIT
053C 25 27 =            BCS     FIDOK
                ; HERE IF PASSWO BAD
053E BD 0614            JSR     ERRTRY  ;INC ERR COUNT
0541 8A F0              ORAA    #$F0    ;OR IN BAD ID FLAG
0543 BD 0414            JSR     PUTA    ;OUTPUT 2ND BYTE
                ;
0546 CE 0001    FID:    LDX     #$0001  ;OUTPUT REST OF CARD DATA
0549 A6 31Z     FIDL:   LDAA    DIGTAB,X ;MUST PACK DATA, TWO
```

```
054B 08             INX             ;DIGITS PER BYTE
054C 48             ASLA
054D 48             ASLA
054E 48             ASLA
054F 48             ASLA
0550 AA 31Z         ORAA     DIGTAB,X
0552 BD 0414        JSR      PUTA
0555 08             INX
0556 8C 0007        CPX      #$07
0559 26 EE =        BNE      FIDL
               ;
055B 86 FE          LDAA     #$FE    ;FLAG CARD AS PROCESSED
055D 97 1FZ         STAA     CRDFLG
055F CE FA24        LDX      #T.10S  ;CONSOLE MUST RESPOND
0562 DF 10Z         STX      EQCNTR  ;WITHIN TIME LIMIT
               ;
0564 39             RTS
               ;
0565 BD 0414   FIDOK: JSR    PUTA    ;IF ID OK, CHECK DURESS
0568 BD 0637        JSR      DURESS
056B 20 D9 =        BRA      FID
               ;
               ;
               ;
               ;  FSTAND
               ;
               ;
               ;  ACCUMULATE AND TRANSMIT CARD DATA FROM
               ;  STANDARD READER IN RESPONSE TO A POLL
               ;
056D 96 81     FSTAND: LDAA  FPROM+1 ;OUTPUT HEADER BYTE
056F 48             ASLA
0570 48             ASLA
0571 48             ASLA
0572 48             ASLA
```

```
0573 BD 0414            JSR     PUTA
                  ;
0576 BD 0423            JSR     CARDRD  ;READ CARD
                  ;
0579 86 00              LDAA    #$00
057B CE 0000            LDX     #$0000  ;OUTPUT CARD DATA
057E AA 31Z       FSTL: ORAA    DIGTAB,X
0580 BD 0414            JSR     PUTA
0583 08                 INX
0584 A6 31Z             LDAA    DIGTAB,X
0586 48                 ASLA
0587 48                 ASLA
0588 48                 ASLA
0589 48                 ASLA
058A 08                 INX
058B 8C 0008            CPX     #$08
058E 26 EE =            BNE     FSTL
                  ;
0590 86 FE              LDAA    #$FE    ;FLAG CARD AS PROCESSED
0592 97 1FZ             STAA    CRDFLG
0594 CE FA24            LDX     #T.10S  ;CONSOLE MUST RESPOND
0597 DF 10Z             STX     EQCNTR  ;WITHIN TIME LIMIT
                  ;
0599 39                 RTS
                  ;
                  ;
                  ;
                  ;  FRTL
                  ;
                  ;
                  ;  FRTL CHECKS TO SEE IF THIS CARD IS THE SAME
                  ;  AS THE LAST ONE.  IF IT IS NOT, IT STORES
                  ;  THIS CARD'S NUMBER AND CLEARS THE COUNT
                  ;  HOLDING THE NUMBER OF ERROR ENTRY ATTEMPTS
                  ;
```

```
059A CE 0007  FRTL:   LDX     #$0007  ;CHK IF THIS CRD
059D A6 30Z   FRTLL:  LDAA    DIGTAB-1,X ;SAME AS LAST
059F A1 39Z           CMPA    RTLBUF-1,X
05A1 26 04 =          BNE     FRL
05A3 09               DEX
05A4 26 F7 =          BNE     FRTLL
05A6 39               RTS
              ;
05A7 A6 30Z   FRL:    LDAA    DIGTAB-1,X ;IF A NEW CARD
05A9 A7 39Z           STAA    RTLBUF-1,X ;SAVE IT'S NUMBER
05AB 09               DEX
05AC 26 F9 =          BNE     FRL
              ;
05AE 7F 0039          CLR     NTRIES  ;CLEAR ERROR COUNT
05B1 39               RTS
              ;
              ;*****************************************************
               ******************
              ;
              ;
              ;  DEGRADED MODE SCANNER
              ;
              ;
              ;*****************************************************
               ******************
              ;
              ;
              ;
              ;
              ;  DMSCAN
              ;
              ;
              ;  CHECK IF THERE IS A CARD IN READER.
              ;  IF SO, WE MUST FIGURE OUT WHAT KIND
              ;  OF A READER WE ARE AND BRANCH TO
```

```
                ;  THE APPROPRIATE SERVICE ROUTINE.
                ;
05B2 96 1FZ     DMSCAN: LDAA    CRDFLG  ;CHECK IF UNPROCESSED
05B4 81 01              CMPA    #$01    ;CARD IN READER
05B6 27 01 =            BEQ     DMS
05B8 39         DMQUIT: RTS             ;IF NOT, QUIT
                ;
05B9 96 80      DMS:    LDAA    FPROM   ;CHECK FOR DM OPTION
05BB 84 40              ANDA    #O.DM
05BD 27 F9 =            BEQ     DMQUIT
05C3 26 F3 =            BNE     DMQUIT
                ;
05C5 96 80              LDAA    FPROM   ;CHECK IF IDEK RDR
05C7 84 01              ANDA    #O.IDEK
05C9 26 02 =            BNE     DMIDEK
                ;
05CB 20 23 =            BRA     DMSTND  ;MUST BE STNDRD RDR
                ;
                    ;
                ;
                ;  DMIDEK
                ;
                ;
                ;  CARD-IN SERVICE ROUTINE FOR IDEK
                ;  READERS IF READER IS IN DEGRADED MODE.
                ;  THIS ROUTINE READS KEYBOARD AND CHECKS
                ;  IF PERSONAL CODE IS OK, THEN CALLS DMSTND
                ;  TO SEE IF SYSTEM CODE MATCHES SWITCHES.
                ;
05CD 96 1BZ     DMIDEK: LDAA    KBDFLG  ;IMITATE STNDRD RDR IF
05CF 26 1F =            BNE     DMSTND  ;NOT IN KBD MODE
                ;
05D1 96 24Z             LDAA    KEYCNT  ;IGNORE UNTIL 4 DIGITS
05D3 81 04              CMPA    #$04    ;HAVE BEEN ENTERED
05D5 2B E1 =            BMI     DMQUIT
                ;
```

```
05D7 BD 0423          JSR    CARDRD  ;READ CARD
                 ;
05DA BD 059A          JSR    FRTL    ;RESTART ERROR COUNT IF
                 ;               ;THIS CARD NOT SAME AS LAST
                 ;
05DD BD 064C          JSR    COMBIN  ;COMBINE AND PERMUTE
                 ;
05E0 25 0B =          BCS    DMIDOK  ;OPEN IF ID OK
05E2 BD 03A3          JSR    C.NG    ;IF ID BAD ACTIVATE
05E5 BD 0614          JSR    ERRTRY  ;NG SEQUENCE
                 ;
05E8 86 FE            LDAA   #$FE    ;FLAG CARD AS PROCESSED
05EA 97 1FZ           STAA   CRDFLG
                 ;

05EC 39               RTS
                 ;
                 ;
05ED BD 0637  DMIDOK: JSR    DURESS  ;CHECK IF UNDER DURESS
                 ;
                 ;
                 ;  DMSTND
                 ;
                 ;
                 ;
                 ;  SERVICE ROUTINE FOR THE STANDARD READER IF
                 ;  SYSTEM IS IN DEGRADED MODE.  COMPARES
                 ;  SYSTEM CODE ON CARD WITH THAT ON READER
                 ;  AND ACTIVATES APPROPRIATE RELAY SEQUENCE.
                 ;
05F0 BD 0423  DMSTND: JSR    CARDRD  ;READ CARD
                 ;
05F3 96 C5            LDAA   S.SYS   ;CHECK IF SYS CODE ON
05F5 84 0F            ANDA   #$0F    ;CARD MATCHES SWITCHES
05F7 91 37Z           CMPA   DIGTAB+6
```

```
05F9 26 0C =            BNE     DMCLSD
05FB 96 C5              LDAA    S.SYS
05FD 84 F0              ANDA    #$F0
05FF 44                 LSRA
0600 44                 LSRA
0601 44                 LSRA
0602 44                 LSRA
0603 91 36Z             CMPA    DIGTAB+5
0605 27 05 =            BEQ     DMOPEN
               ;
0607 BD 03A3   DMCLSD:  JSR     C.NG      ;NO MATCH--NO GO
060A 20 03 =            BRA     DMSO
               ;
060C BD 038C   DMOPEN:  JSR     C.GO      ;IF MATCH, OPEN DOOR
               ;
060F 86 FE     DMSO:    LDAA    #$FE      ;FLAG CARD AS PROCESSED
0611 97 1FZ             STAA    CRDFLG
               ;
0613 39                 RTS
               ;
               ;
               ;
               ;  ERRTRY
               ;
               ;
               ;  COUNTS NUMBER OF IDEK ERRORS FOR A
               ;  PARTICULAR CARD AND CLOSES ERROR RELAY
               ;  IF COUNT EXCEEDS THAT SET ON SWITCHES
               ;
               ;
0614 36        ERRTRY:  PSHA
               ;
0615 96 81              LDAA    FPROM+1 ;SEE IF OPTION IN
0617 84 40              ANDA    #O.ERAN
0619 27 1A =            BEQ     ETD
```

```
                 ;
061B 7C 0039            INC     NTRIES  ;INC ERR COUNT
                 ;
061E 96 C3              LDAA    S.IDEK  ;READ NTRIES FROM SWITCHES
0620 44                 LSRA
0621 84 07              ANDA    #$07
0623 4C                 INCA            ;SWITCH=0 MEANS ONE TRY
0624 91 39Z             CMPA    NTRIES
0626 26 0D =            BNE     ETD
                 ;
0628 86 10              LDAA    #R.ERAN ;TURN ON ERR RLY
062A BD 0203            JSR     RLYON
062D 7F 0039            CLR     NTRIES  ;RESET ERR CNTR
0630 CE FE3E            LDX     #T.03S  ;SET RLY TIME DLY
0633 DF 08Z             STX     ERCNTR
                 ;
0635 32          ETD:   PULA
0636 39                 RTS
                 ;
                 ;
                 ;
                 ;  DURESS
                 ;
                 ;
                 ;  CHECKS DURESS FLAG AND SETS RELAY ACCORDINGLY
                 ;
0637 96 81       DURESS: LDAA   FPROM+1
0639 84 20              ANDA    #O.DUR
063B 27 0E =            BEQ     NODUR
063D 96 25Z             LDAA    DURESF
063F 27 0A =            BEQ     NODUR
                 ;
0641 86 08              LDAA    #R.DUR
0643 BD 0203            JSR     RLYON
0646 CE FE3E            LDX     #T.03S
```

```
0649 DF 06Z            STX     DUCNTR
                ;
064B 39         NODUR:  RTS
                ;
                ;
                ; ROUTINE TO CHECK IDEK PASSWORD
                ; RETURNS WITH CARRY=1 IF OK
                ;       CARRY=0 IF BAD
                ;
                ; CALLS MIX TO RECALCULATE COMBINATION FUNCTION
                ; ASSUMES CARD IMAGE IN DIGTAB
                ; AND PASSWORD IN KEYTAB
                ;
                ; MIXPTR IS A CALCULATED INDEX INTO DIGTAB
                ; COMBX IS AN INDEX INTO MASTER
                ; WE PROCESS THE DIGITS OF THE PASSWORD IN ORDER
                ;
      064CP     COMBIN  = *
064C BD 066F            JSR     MIX     ;TABLE OF DIGIT INDICES IN
                                         'MASTER'
064F 7F 004B            CLR     MIXPTR  ;MSB OF XREG
0652 CE 0000            LDX     #0      ;FIRST DIGIT OF PASSWORD
0655 A6 28Z     COMBL:  LDAA    MASTER,X
0657 DF 49Z             STX     COMBX
0659 97 4CZ             STAA    MIXPTR+1
065B DE 4BZ             LDX     MIXPTR
                ; NOW X INDICATES WHICH DIGIT OF HIS
                ; CARD FORMS THIS DIGIT OF THE PASSWORD
065D A6 31Z             LDAA    DIGTAB,X
065F DE 49Z             LDX     COMBX
0661 A1 20Z             CMPA    KEYTAB,X
0663 26 08 =            BNE     COMBAD
0665 08                 INX
0666 8C 0004            CPX     #4
0669 26 EA =            BNE     COMBL
```

```
066B 0D              SEC
066C 39              RTS
               ;
066D 0C        COMBAD: CLC
066E 39              RTS
               ;
               ;
               ; SUBROUTINE TO PREPARE COMPARAND
               ; TABLE FOR IDEK PERSONAL CODE
               ;
               ; THE IDEK CODE IS 4 DIGITS TAKEN FROM THE CARDHOLDER'S
               ; 5 DIGIT CODE IN AN ARBITRARY ORDER
               ;
               ; SO WE HAVE ALL COMBINATIONS OF FIVE THINGS
               ; TAKEN FOUR AT A TIME
               ; >>>120<<<
               ; SPECIFY WHICH OF THE FIVE IS MISSING (3 BITS)
               ; >>>24<<<
               ; SPECIFY WHICH OF THE FOUR APPEARS FIRST (2 BITS)
               ; >>>6<<<
               ; SPECIFY WHICH COMES NEXT (2 BITS)
               ; >>>2<<<
               ; TAKE THE REMAINING TWO IN ORDER, OR REVERSED (1 BIT)
               ;
               ; BIT MEANINGS:
               ;  TTHE PERM/COMB SWITCH HAS FOUR FIELDS,
               ; IN THIS FORM: (MMMFFSSX)
               ; WHERE MMM INDICATES WHICH IS MISSING
               ;       FF...WHICH COMES FIRST
               ;       SS...WHICH COMES SECOND
               ;       X...=1 IF LAST SHOULD BE FLIPPED
               ;
               ; ERROR BEHAVIOR:
               ; MMM MUST BE IN THE RANGE 0-4
               ; >>> IF IT ISN'T, IT ACTS LIKE 4
```

```
                ; SS MUST BE DIFFERENT FROM FF
                ; >>> IF IT ISN'T, THE SECOND AND THIRD
                ; DIGITS ARE TAKEN FROM THE TWO LOWEST OF THE
                ; THREE REMAINING POSSIBILITIES
                ;***
          066FP MIX     =       *
066F BD 067C            JSR     MIX1
0672 BD 0699            JSR     MIX2
0675 BD 06C4            JSR     MIX3
0678 BD 06D6            JSR     MIX4
067B 39                 RTS
                ;
                ;
                ; HERE TO TABULATE WHICH FOUR DIGITS ARE USED
                ; RESULT IN MASHER
                ;
067C 96 C4      MIX1:   LDAA    S.COMB
067E 43                 COMA
067F 44                 LSRA
0680 44                 LSRA
0681 44                 LSRA
0682 44                 LSRA
0683 44                 LSRA
0684 97 30Z             STAA    MATCH
                ; NOW MATCH CONTAINS THE 3 MSB'S FROM THE SWITCHES
                ; BUT RIGHT JUSTIFIED
                ; IT DESIGNATES WHICH PERSON DIGIT IS NOT USED
0686 4F                 CLRA            ;A CONTAINS DIGIT (0-4)
0687 C6 04              LDAB    #4      ;LOOP COUNTER
0689 CE 002C            LDX     #MASHER ;RESULT TABLE
068C 91 30Z     MIXL:   CMPA    MATCH   ;IS THIS THE EXCEPTION?
068E 26 01 =            BNE     MIXS
0690 4C                 INCA            ;LET A STEP AHEAD
0691 A7 00      MIXS:   STAA    0,X
0693 08                 INX
```

```
0694 4C                 INCA
0695 5A                 DECB
0696 26 F4 =            BNE     MIXL
0698 39                 RTS
                ;
                ; HERE TO FILL THE FIRST AND SECOND SLOTS
                ; INPUT = MASHER  (MODIFIED)
                ; OUTPUT = MASTER
                ;
                ; AS DIGITS ARE TAKEN FROM MASHER, THEY ARE DELETED
                ; (SET TO NEGATIVE NUMBERS)
                ;
     0699P  MIX2        =       *
0699 7F 004B            CLR     MIXPTR
069C 96 C4              LDAA    S.COMB
069E 43                 COMA
069F 44                 LSRA
06A0 44                 LSRA
06A1 44                 LSRA
06A2 84 03              ANDA    #$03
06A4 97 4CZ             STAA    MIXPTR+1
06A6 DE 4BZ             LDX     MIXPTR
                ; AT THIS POINT, X CONTAINS BITS TAKEN FROM THE SWITCHES
                ; (000XX000) BUT RIGHT JUSTIFIED
06A8 A6 2CZ             LDAA    MASHER,X        ;GRAB SPEDIFIED DIGIT
06AA 97 2BZ             STAA    MASTER+3
06AC 43                 COMA
06AD A7 2CZ             STAA    MASHER,X        ;MARK IT REMOVED
                ;
                ; NOW DO THE SAME TRICK FOR THE SECOND DIGIT OF MASTER
                ;
06AF 96 C4              LDAA    S.COMB
06B1 43                 COMA
06B2 44                 LSRA
06B3 84 03              ANDA    #$03
```

```
06B5 97 4CZ          STAA    MIXPTR+1
06B7 DE 4BZ          LDX     MIXPTR
06B9 A6 2CZ          LDAA    MASHER,X
06BB 2A 01 =         BPL     MIX2S
06BD 43              COMA    ;AC IS NOW POSITIVE
06BE 97 2AZ  MIX2S:  STAA    MASTER+2
06C0 43              COMA
06C1 A7 2CZ          STAA    MASHER,X
06C3 39              RTS
             ;
             ;
             ; HERE TO FILL THE LAST TWO SLOTS OF MASTER
             ;
      06C4P  MIX3    =       *
06C4 CE 002B         LDX     #MASHER-1
06C7 08      MIX3L:  INX
06C8 A6 00           LDAA    0,X
06CA 2B FB =         BMI     MIX3L   ;IF DELETED, TRY AGAIN
06CC 97 29Z          STAA    MASTER+1
             ; NOW FOR THE LAST ONE
06CE 08      MIX3LL: INX
06CF A6 00           LDAA    0,X
06D1 2B FB =         BMI     MIX3LL
06D3 97 28Z          STAA    MASTER+0
06D5 39              RTS
             ;
             ;
             ; HERE TO SEE IF THE LAST DIGITS SHOULD BE FLIPPED
             ;
      06D6P  MIX4    =       *
06D6 96 C4           LDAA    S.COMB
06D8 43              COMA
06D9 84 01           ANDA    #1
06DB 27 08 =         BEQ     MIXEND
06DD 96 29Z          LDAA    MASTER+1
```

```
06DF D6 28Z          LDAB    MASTER+0
06E1 97 28Z          STAA    MASTER+0
06E3 D7 29Z          STAB    MASTER+1
06E5 39      MIXEND: RTS
             ;
             ;
             ; END OF FILE
             ;
     06E6P   BAKEND  =        *
```

What is claimed is:

1. A circuit used in conjunction with a multi-digit data encoded card for controlling access at a location, comprising:

means sensing and storing said multi-digit data from said encoded card in a predetermined order;

means connected to said sensing and storing means for reordering said multi-digit data to a second order;

a keyboard;

means for comparing data entered on said keyboard with said multi-digit data in said second order to control said access; and switch means for changing said second order.

2. A circuit used in conjunction with a multi-digit data encoded card as defined in claim 1 wherein said means for reordering comprises plural switches, said switches controlling the order of access of data from said sensing and storing means to said comparing means.

3. A circuit used in conjunction with a multi-digit data encoded card as defined in claim 1 wherein said means for reordering additionally selects a subset from said multi-digit data for access to said comparing means.

4. A circuit used in conjunction with a multi-digit data encoded card as defined in claim 3 wherein said means for reordering comprises plural switches, said switches selecting the order of access of data from said storing means to said comparing means.

5. A circuit used in conjunction with a multi-digit data encoded card as defined in claim 4 wherein said plural switches control the subset of said multi-digit data to be accessed to said comparing means.

6. A circuit used in conjunction with a multi-digit data encoded card as defined in claim 1 additionally comprising:

means delaying further operation of said comparing means in response to failure of said data entered on said keyboard to properly compare with said multi-digit data in said second order.

7. A circuit used in conjunction with a multi-digit data encoded card as defined in claim 1 additionally comprising:

means for comparing said multi-digit data from said encoded card with data stored in a memory to further control access at said location.

8. A circuit used in conjunction with a multi-digit data encoded card as defined in claim 1 wherein said switch means comprises plural coded switches.

9. A circuit used in conjunction with a multi-digit data encoded card as defined in claim 1 additionally comprising:

keylock means for limiting access to said switch means.

10. A circuit used in conjunction with a data encoded card for limiting access at a location, comprising:

a keyboard providing keystroke data;

means sensing data from said encoded card to provide card data;

means scrambling said card data in a predetermined pattern to provide scrambled data;

means comparing said scrambled data with keystroke data from said keyboard and controlling access based on said comparison; and switch means for altering said predetermined pattern.

11. A circuit used in conjunction with a data encoded card as defined in claim 10 wherein said switch means additionally selects a subset of said data from said encoded card for said predetermined pattern.

12. A circuit used in conjunction with a data encoded card as defined in claim 11 wherein said switch means permits a repetition of certain data from said encoded card in said predetermined pattern.

13. A circuit used in conjunction with a data encoded card as defined in claim 10 additionally comprising:

means limiting access to said switch means.

14. A circuit used in conjunction with a data encoded card as defined in claim 10 wherein said switch means operates to permit alteration of said predetermined pattern at said location.

15. Apparatus for controlling access, comprising:

means for reading a multi-digit number in a predetermined order from a magnetically encoded data card;

storage means connected to said reading means for storing said multi-digit number;

means connected to said storage means for accessing said multi-digit number in a selected order;

switch means connected to said accessing means for adjusting said selected order;

means for inputting a second multi-digit number, in sequence; and means connected with said accessing means for sequentially comparing said second multi-digit number with said selected order multi-digit number, and for controlling access based on said comparison.

16. Apparatus for controlling access as defined in claim 15 wherein said means for inputting a second multi-digit number comprises a manually operated keyboard.

17. Apparatus for controlling access as defined in claim 15 additionally comprising:

means for delaying further operation of said comparing means in response to a failure of said comparing means to sense identity between said second multi-digit number and said selected order multi-digit number.

* * * * *